(12) United States Patent
Maekawa et al.

(10) Patent No.: US 6,848,101 B2
(45) Date of Patent: Jan. 25, 2005

(54) SOFTWARE MANAGEMENT SYSTEM FOR PROVIDING SOFTWARE INSTALLATION AND MAINTENANCE OVER A NETWORK

(75) Inventors: Takaaki Maekawa, Tokyo (JP); Atsushi Nishioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 793 days.

(21) Appl. No.: 09/759,243

(22) Filed: Jan. 16, 2001

(65) Prior Publication Data

US 2002/0095485 A1 Jul. 18, 2002

(30) Foreign Application Priority Data

Jul. 12, 2000 (JP) ...................................... 2000-211446

(51) Int. Cl.[7] .............................................. G06F 13/00
(52) U.S. Cl. ...................................................... 717/178
(58) Field of Search .............................. 709/200, 223; 707/203; 714/1, 25, 37, 38, 100, 121, 168, 169, 170, 171, 172, 173, 174, 175, 176, 177, 178

(56) References Cited

U.S. PATENT DOCUMENTS 6,256,773 B1 * 7/2001 Bowman-Amuah ......... 717/121

FOREIGN PATENT DOCUMENTS

JP 11-65968 3/1999

OTHER PUBLICATIONS

"Overview Of The Open Services Gateway Initiative", OSGI, Inc., Specification Overview version 1.0, Jan. 2000, pp. 1–12 (http://www.osgi.org/about/specoverview.pdf).

* cited by examiner

Primary Examiner—Robert B. Harrell
(74) Attorney, Agent, or Firm—Leydig, Voit & Mayer, Ltd.

(57) ABSTRACT

A software management system for processing and maintaining improved reliability of software delivered on a wide-area network. A center server includes a script describing operation of the application, and a fault countermeasure unit for coping with the occurrence of a fault. A local server includes a network-directed language execution environment, a remote management unit for downloading or deleting the application, a script interpretation unit, and a highly reliable unit for recording event data that occur while the application is being executed, for managing the data when the fault has occurred, and for executing a restoration process. The system guarantees safe and reliable operation of the software that is downloaded through a wide-area network, and supports the collection of fault data and restoration even when an abnormal condition has occurred.

15 Claims, 20 Drawing Sheets

FIG. 9

```
<?XML version="1.0" ?>
<AIR CONDITIONER CONTROL>
  <INITIALIZE>
    <AIR CONDITIONER>
      <TEMP.UNIT=CENTIGRADE>28<?TEMP.>
      <WIND VELOCITY>QUIET</WIND VELOCITY>
    </AIR CONDITIONER>
    <TEMP.SENSOR>
        .
        .
    </TEMP.SENSOR>
  </INITIALIZE>
  <AUTO.CONTROL>
      .
      .
  </AUTO.CONTROL>
</AIR CONDITIONER CONTROL>
```

FIG. 10

DTD FOR XML DOCUMENT

```
<!DOCTYPE   AIR CONDITIONER CONTROL [
<!ELEMENT   AIR CONDITIONER CONTROL (INITIALIZE,AUTO.CONTROL)
<!ELEMENT   INITIALIZE (AIR CONDITIONER,TEMP.SENSOR) >
<!ELEMENT   AUTO.CONTROL (…) >
<!ELEMENT   AIR CONDITIONER (TEMP.WIND VELOCITY) >
<!ELEMENT   SENSOR (…) >
<!ELEMENT   TEMP. (     ) >
<!ELEMENT   WIND VELOCITY (     ) >
            :
            :
<!ATTRLIST  TEMP.UNIT (CENT | FAHR)"CENT">
```

SOFTWARE MANAGEMENT SYSTEM FOR PROVIDING SOFTWARE INSTALLATION AND MAINTENANCE OVER A NETWORK

BACKGROUND OF THE INVENTION

1. Field of the Invention

The present invention relates to a software management system comprising a network system which includes a center server and a local server connected to the center server via a wide-area network, such that the center server manages the whole wide-area network. More particularly, the invention relates to a software management system which features an improved function for downloading application software from the center server onto the local server maintaining improved reliability.

2. Prior Art

Use of a wide-area network such as internet is ever spreading in recent years. Further, the widespread use of "Java" which is a network-directed program language, is requiring an increased amount of processing for downloading software from the center server onto a local server (computer, etc.) via a wide-area network.

Besides, in recent years, even a computer having a relatively small memory capacity, such as a built-in type local server, is requiring a mechanism for downloading application software.

However, the local server of the built-in type having a small memory capacity is not often capable of placing all applications on the memory at all times. Besides, the local server of the built-in type has not been equipped with an auxiliary storage unit such as disk and must, hence, be equipped with a function for downloading the software as required and for deleting the software when it is no longer necessary.

The above-mentioned remote software management function has heretofore been standardized under OSG (Open Gateway Service) determined by, for example, OGSi (Open Gateway Service Initiative)(for details, see Website "http://www.osgi.org/" of OGSi).

The OSG standard specifies the system for downloading and deleting the software. When the system requires higher reliability, however, a mechanism must be devised and furnished to guarantee a highly reliable function and a safe and reliable operation.

For example, "a network management method and a system therefor" disclosed in Japanese unexamined Patent Publication (Kokai) No. 11-65968) is one in which a system based on a manager agent model specified under "M. 3010" recommended by ITU-T is furnished with a mechanism for downloading software written in Java.

The network management system described in the above publication is based on the manager agent model specified under "M. 3010" recommended by ITU-T, but gives no attention to the processing of when the operation of the software itself described in Java becomes abnormal or to the contrivance for improving reliability.

That is, in conventional remote software management systems operating via a network, the basic functions for downloading and deletion have been specified, but no consideration has been given to improving the reliability of the system, such as processing for coping with the abnormal operation of the software that is downloaded or for guaranteeing safe and reliable operation.

When consideration is given to software that may be further delivered via a network in the future, it becomes very necessary to maintain safety of the software that is downloaded and to cope with abnormal operation that may occur. However, no conventional system is capable of coping with the demand to a sufficient degree.

As described above, the conventional software management system is capable of neither meeting the requirement for maintaining safety of the software that is downloaded nor coping with abnormal operation that may happen.

SUMMARY OF THE INVENTION

The present invention was accomplished in order to solve the above-mentioned problem, and has the object of providing a function which guarantees safe and reliable operation of the software that is downloaded through a network, and supports the collection of fault data and restoration even in case an abnormal condition has occurred, and of obtaining a software management system for processing, maintaining improved reliability, a software delivered on a wide-area network.

A software management system according to the present invention comprises a network system which includes a center server and a local server connected to the center server via a wide-area network, wherein: the center server includes; an application that operates upon being downloaded onto the local server; a script describing the operation of the application; and a fault countermeasure means for coping with the occurrence of a fault; and the local server includes: a network-directed language execution environment; a remote management means for downloading the application from the center server, and for deleting the application after the processing has been finished; a script interpretation means for interpreting the script and for requesting the application to execute the processing; and a highly reliable means for recording event data that occur while the application is being executed, for managing the data when the fault has occurred, and for executing the restoration processing.

In the software management system of the invention, the remote management means includes: center server data and application data; a request processing means that works in response to a request for executing the application; an application downloading means for downloading the application from the center server based upon the center server data and the application data; and an application management means for executing the processing for driving or deleting the application based on the application data.

In the software management system of the invention, the script interpretation means includes: a script definition and a list of events; an interpretation means for interpreting the script in accordance with the script definition and for outputting an event corresponding to the content of definition of the script; and an event drive means for fetching the event and for picking up a processing that is driven by the event according to the list of events.

In the software management system of the invention, the script is described in XML (extensible markup language), and the script definition is described in DTD (document type definition).

In the software management system of the invention, the fault countermeasure means includes: a fault data-obtaining means for obtaining fault data from the local server in case fault has occurred; and a fault countermeasure-notifying means for determining the countermeasure against the fault in case the fault has occurred and for notifying it to the local server; and the highly reliable means includes: a fault detector means for detecting the occurrence of a fault that has occurred; a fault data correction means for correcting the fault data when the fault has occurred; a fault-notifying means for notifying the fault data to the center server; a restoration means for restoring the fault relying upon the countermeasure against the fault from the center server; and an event collection means for correcting and recording the event data.

In the software management system of the invention, the fault countermeasure means includes: a list of fault countermeasures, storing countermeasures against faults for each of the kinds of the fault data; and the fault countermeasure-notifying means includes: a fault countermeasure detector means for detecting a countermeasure against fault corresponding to the kind of the fault data based upon a list of the fault countermeasures; and a notifying means for notifying the countermeasure against fault to the local server.

In the software management system of the invention, the fault countermeasure means includes: a fault data-obtaining means for obtaining fault data of when the fault has occurred from the local server; and the highly reliable means includes:

a fault detector means for detecting the occurrence of a fault; a fault data collection means for collecting fault data of when the fault has occurred; a restoration means for autonomously coping with the occurrence of a fault to automatically restore the fault; a notifying means for notifying the fault data and the data of automatic restoration to the center server; and an event collection means for collecting and recording the event data.

In the software management system of the invention, the local servers exist in a plural number, each of which including the network-directed language execution environment, the remote management means, the script interpretation means and the highly reliable means.

In the software management system of the invention, the center servers exist in a plural number, each of which including the application, the script and the fault countermeasure means.

In the software management system of the invention, the local servers exist in a plural number, at least one of which including the network-directed language execution environment, the remote management means, the script interpretation means and the highly reliable means, and other local servers including the network-directed language execution environment, the remote management means and the script interpretation means.

A software management system according to the present invention comprises a network system which includes a center server and a local server connected to the center server via a wide-area network, wherein: the center server includes; an application that operates upon being downloaded onto the local server; and a script describing the operation of the application; and the local server includes: a network-directed language execution environment; a remote management means for downloading the application from the center server, and for deleting the application after the processing has been finished; and a script interpretation means for interpreting the script and for requesting the application to execute the processing.

In the software management system of the invention, the local servers exist in a plural number, each of which including the network-directed language execution environment, the remote management means and the script interpretation means.

A software management system according to the present invention comprises a network system which includes a center server and a local server connected to the center server via a wide-area network, wherein: the center server includes; an application that operates upon being downloaded onto the local server; and a fault countermeasure means for coping with the occurrence of a fault; and the local server includes: a network-directed language execution environment; a remote management means for downloading the application from the center server, and for deleting the application after the processing has been finished; and a highly reliable means for recording event data that occur while the application is being executed, for managing the data when the fault has occurred, and for executing the restoration processing.

In the software management system of the invention, the local servers exist in a plural number, each of which including the network-directed language execution environment, the remote management means and the highly reliable means.

BRIEF DESCRIPTION OF THE DRAWINGS

FIG. 9 is a diagram illustrating an example of description services according to an embodiment 4 of the present invention;

FIG. 10 is a diagram illustrating an example of description services according to the embodiment 4 of the present invention;

DESCRIPTION OF THE PREFERRED EMBODIMENTS

Embodiment 1.

An embodiment 1 of the present invention will now be described in detail with reference to the drawings.

Figure 1:
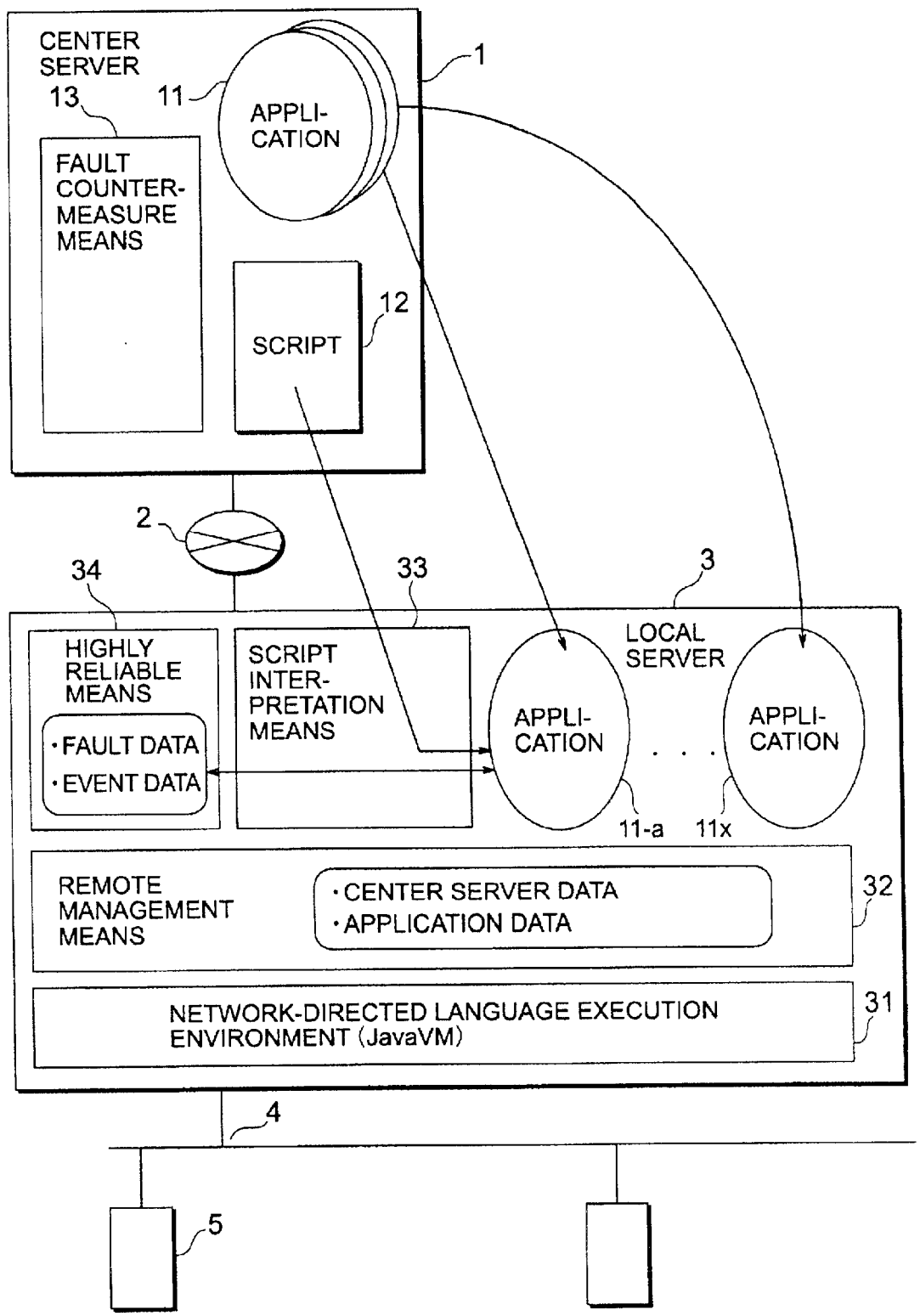
FIG. 1 is a block diagram illustrating the constitution of an embodiment 1 of the present invention.

FIG. 1 is a block diagram schematically illustrating the constitution according to the embodiment 1 of the present invention.

In FIG. 1, a center server 1 includes an application 11, a script 12 describing the operation of the application, and a fault countermeasure means 13 which copes with the occurrence of a fault.

As will be described later, the application 11 includes plural applications 11a to 11x, and the script 12 includes plural scripts 12a to 12x corresponding to the applications 11a to 11x.

A wide-area network 2 connects the center server 1 to a local server 3.

The application 11 in the center server 1 is downloaded onto the local server 3 through the wide-area network 2 and is operated.

The local server 3 includes the applications 11a to 11x that are downloaded from the center server 1 as required, a network-directed language execution environment 31 comprising Java VM, a remote management means 32, a script interpretation means 33, and a highly reliable means 34.

The remote management means 32 executes the processing such as downloading of the application 11 from the center server 1 and the deletion after the processing has been finished.

The highly reliable means 34 records event data that occur while the application 11 is being executed, manages the data when a fault has occurred, and executes the restoration processing.

A local network 4 connects the local server 3 to equipment 5 that are to be managed.

Next, described below is the operation of the whole system of the embodiment 1 of the invention shown in FIG. 1.

First, among the applications that have been registered in the center server 1, the applications 11a to 11x necessary for the local server 3 are downloaded onto the local server 3 through the wide-area network 2.

The downloaded applications 11a to 11x execute the processing such as controlling the equipment 5 and fetching the data in the equipment 5 that are to be managed being connected via the local network 4.

Next, operation of the embodiment 1 of the invention of FIG. 1 will be concretely described with reference to a flowchart of FIG. 2.

That is, described below are a mechanism of a safe and reliable operation of a software that is downloaded and a mechanism for coping with the abnormal condition that may occur.

Here, the network-directed software execution environment 31 that operates being downloaded from the center server 1 has been established by taking into consideration the "Java" execution environment "Java VM (Java Virtual Machine)" that has now been most widespread.

Here, it needs not be pointed out that the equivalent effect is exhibited even by those other than "Java VM", provided they have functions of the same kind.

Figure 2:
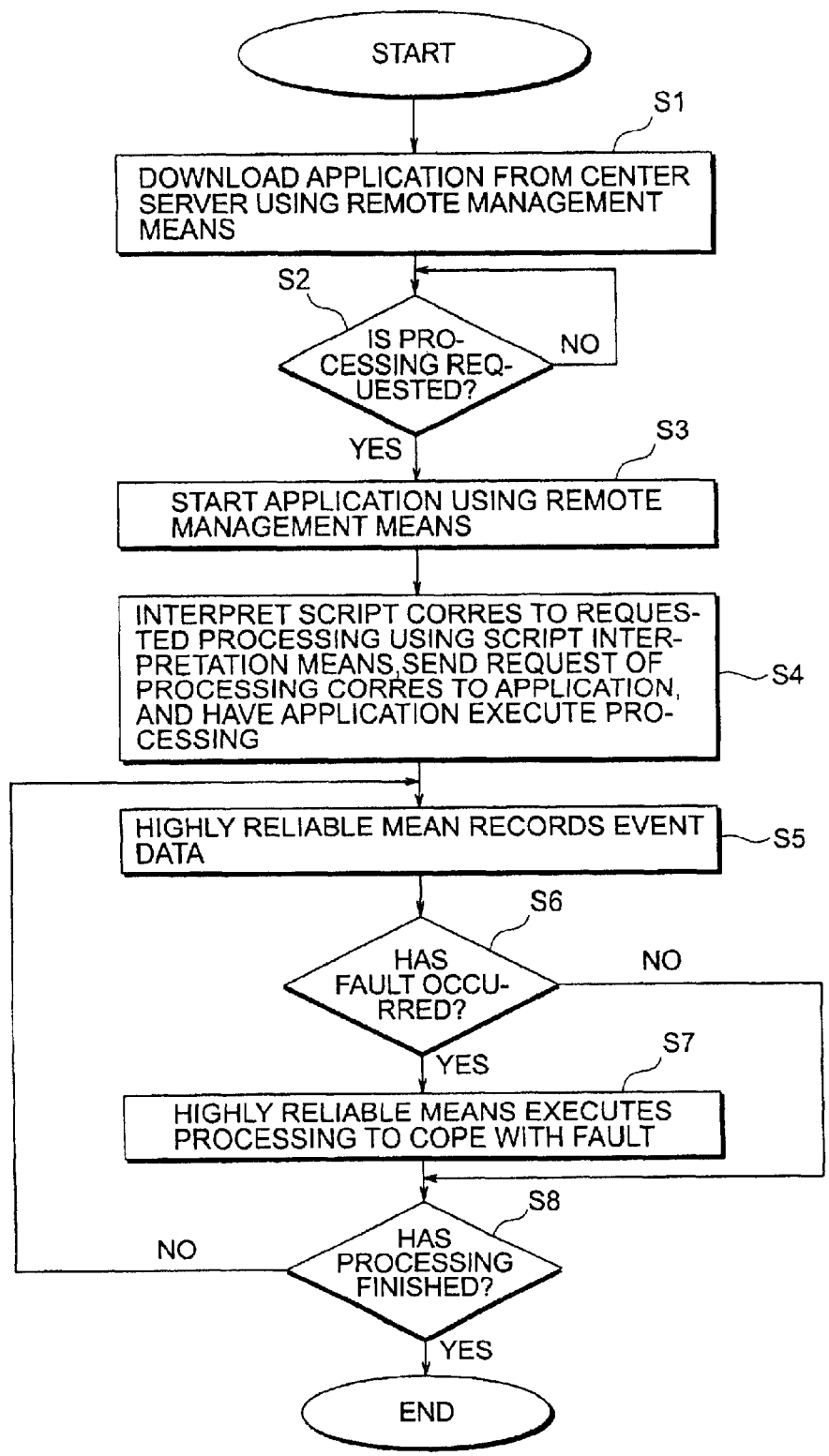
FIG. 2 is a flowchart illustrating the operation according to the embodiment 1 of the present invention.

In FIG. 2, first, the application is downloaded from the center server 1 onto the local server 3 by the remote management means 32 in the local server 3 (step S1).

The downloaded application 11 assumes the standby state until the request of processing is issued from the script interpretation means 33 (step S2).

Here, when a processing is requested for the application 11, when it is judged at step S2 that the processing is requested (i.e., YES) and when the request of processing is input to the remote management means 32, then, the application 11 starts from this moment (step S3).

Here, the script 12 corresponding to the request of processing is downloaded onto the local server 3 from the center server 1, and the content of the processing is interpreted by the script interpretation means 33 in the local server 3.

Further, the script interpretation means 33 sends the request of processing in compliance with the interpreted content of processing to the application 11 to have it execute the processing (step S4).

Thus, the application 11 is executed via the script 12 in order to safely and reliably execute the operation.

That is, the application 11 verifies the operation at the time of being registered to the center server 1. At this moment, if the operation of the application 11 is defined by the script 12, the range of operation is determined, and the operation is not executed outside the range described in the script 12.

Further, if all operation range is defined by the script 12, the operation needs be verified only within the range described in the script 12, making it possible to execute efficient and reliable verification.

Accordingly, every operation can be verified in advance to guarantee the safety in executing the application 11.

Further, since only the operation described in the script 12 is executed, the specification becomes clear making it possible to reliably confirm the required operation.

Various events are issued from the application 11 for which the processing is requested and which is in operation or from a system such as OS.

Reverting to FIG. 2, the highly reliable means 34 detects an event that is issued and records it therein as event data (step S5).

Next, the highly reliable means 34 judges whether the event that is issued is faulty (step S6). When it is so judged that the event is faulty (i.e., YES), not only the processing for accumulating the event data is executed (step S5) but also the processing is executed to cope with the fault (step S7) in compliance with a predetermined procedure, and the routine proceeds to step S8.

When it is judged at step S6 that the event is not faulty (i.e., NO), the routine readily proceeds to step S8.

At step S8, it is judged whether the processing is all finished. When it is judged that the processing is all finished (i.e., YES), the processing routine of FIG. 2 ends, and the request of processing the next application 11 is waited for.

When it is judged at step S8 that the processing has not all been finished (i.e., NO), the routine returns back to step S5 of recording the event data, and the above-mentioned processing is repeated.

Thus, the highly reliable means 34 records the event data issued by the application 11 that is in operation (step S5), and executes a necessary countermeasure processing upon detecting abnormal condition in the application 11 (step S7).

Owing to this function, a suitable countermeasure processing is executed even in case an abnormal condition occurs during the operation, and the system does not lose its function.

Embodiment 2.

The above embodiment 1 did not closely describe the remote management means 32 in the local server 3. However, the remote management means 32 may be constituted as shown in FIG. 3.

Figure 3:
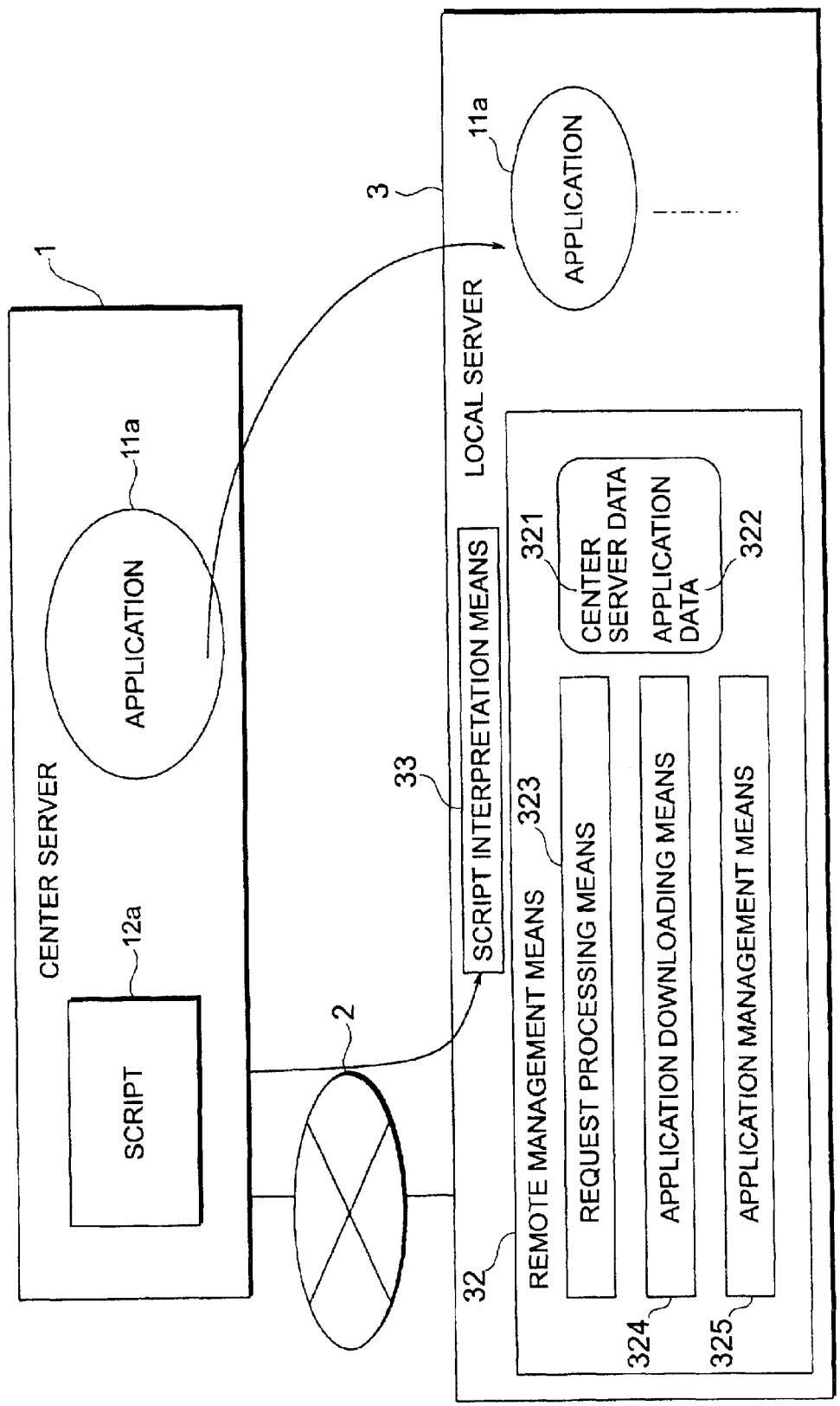
FIG. 3 is a block diagram illustrating the constitution of an embodiment 2 of the present invention.

Described below with reference to FIG. 3 is an embodiment 2 of the present invention embodying the remote management means 32.

FIG. 3 is a block diagram of a constitution for concretely illustrating the function of the remote management means 32 in the local server 3, and wherein the same portions as those described above (see FIG. 1) are denoted by the same reference numerals but are not described again.

FIG. 3 does not illustrate those constitutions that are not directly related to the remote management means 32, such as local network 4 and equipment 5 to be managed.

In the center server 1, further, the script 12a and the application 11a only are representatively shown.

The remote management means 32 includes center server data 321, application data 322, request processing means 323, application downloading means 324 and application management means 325.

The request processing means 323 responds to the request of execution of the application 11 issued from the script interpretation means 33.

The application downloading means 324 downloads the application 11 from the center server 1 based upon the center server data 321 and the application data 322.

The application management means 325 executes the processing such as starting or deleting the application 11 based upon the application data 322.

The operation of the embodiment 2 of the present invention of FIG. 3 will now be concretely described with reference to a flowchart of FIG. 4.

The operation of the system is the same as the one described above. Therefore, the following description gives attention to the processing operation only in the remote management means 32.

First, when the script interpretation means 33 issues the request for starting the application 11a, the request for starting the application 11a is input to the request processing means 323 in the remote management means 32 (step S11).

Next, it is judged whether there is the application 11a that is to be started (step S12). When it is judged that the application 11a does not exist in the local server 3 (i.e., NO), the application downloading means 324 receives a request from the request processing means 323 and makes access to the center server 1 based upon the center server data 321 (step S13).

Thus, the application 11a that is to be started is downloaded from the center server 1 based upon the application data 322 (step S14).

The application data 322 may exist in the center server 1 instead of in the local server 3.

In a state where the application 11a exists in the local server 3, the request processing means 323 starts the application 11a (step S15).

When it is judged at step S12 that the application 11a to be started exists in the local server 3 (i.e., YES), the routine readily proceeds to step S15.

After step S15, the script 12a describing the processing of the application 11a is read from the center server 1 and is sent to the script interpretation means 33 to have the application 11a execute the processing (step S16).

The actual operation of the application 11a is executed according to the content of the script 12a.

Next, it is judged whether the processing of the application 11a has been finished (step S17). When it is judged that the processing has not been completed (i.e., NO), the processing of step S16 is repeated.

When it is judged at step S17 that the processing of the application 11a has been finished (i.e., YES), it is, then, judged whether the application is of the resident type or not (transient type)(step S18).

Figure 4:
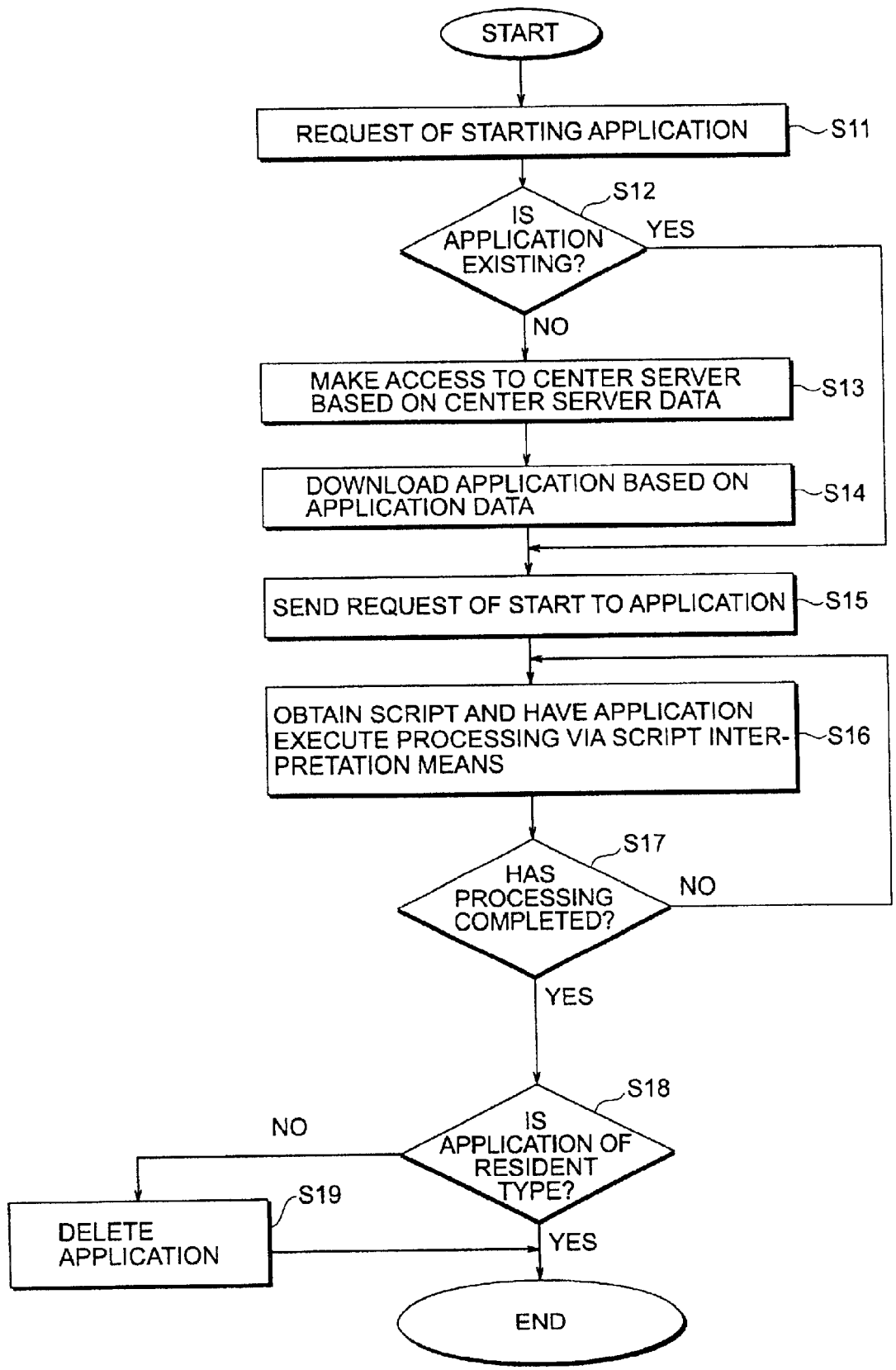
FIG. 4 is a flowchart illustrating the operation according to the embodiment 2 of the present invention.

When it is judged at step S18 that the application 11a is of the transient type (i.e., NO), the application 11a is deleted (step S19), and the processing routine of FIG. 4 ends.

When it is judged at step S18 that the application 11a is of the resident type (i.e., YES), the processing routine of FIG. 4 readily ends, and the application 11a stays in the memory.

As described above, the remote management means 32 makes it possible to efficiently download the software.

Upon deleting the transient-type application 11 after every operation, further, even the local server 3 having a small memory capacity is allowed to operate the system without limited by the processing.

Embodiment 3.

The above embodiment 1 did not closely describe the script interpretation means 33 in the local server 3. However, the script interpretation means 33 may be constituted as shown in FIGS. 5 to 7.

Figure 5:
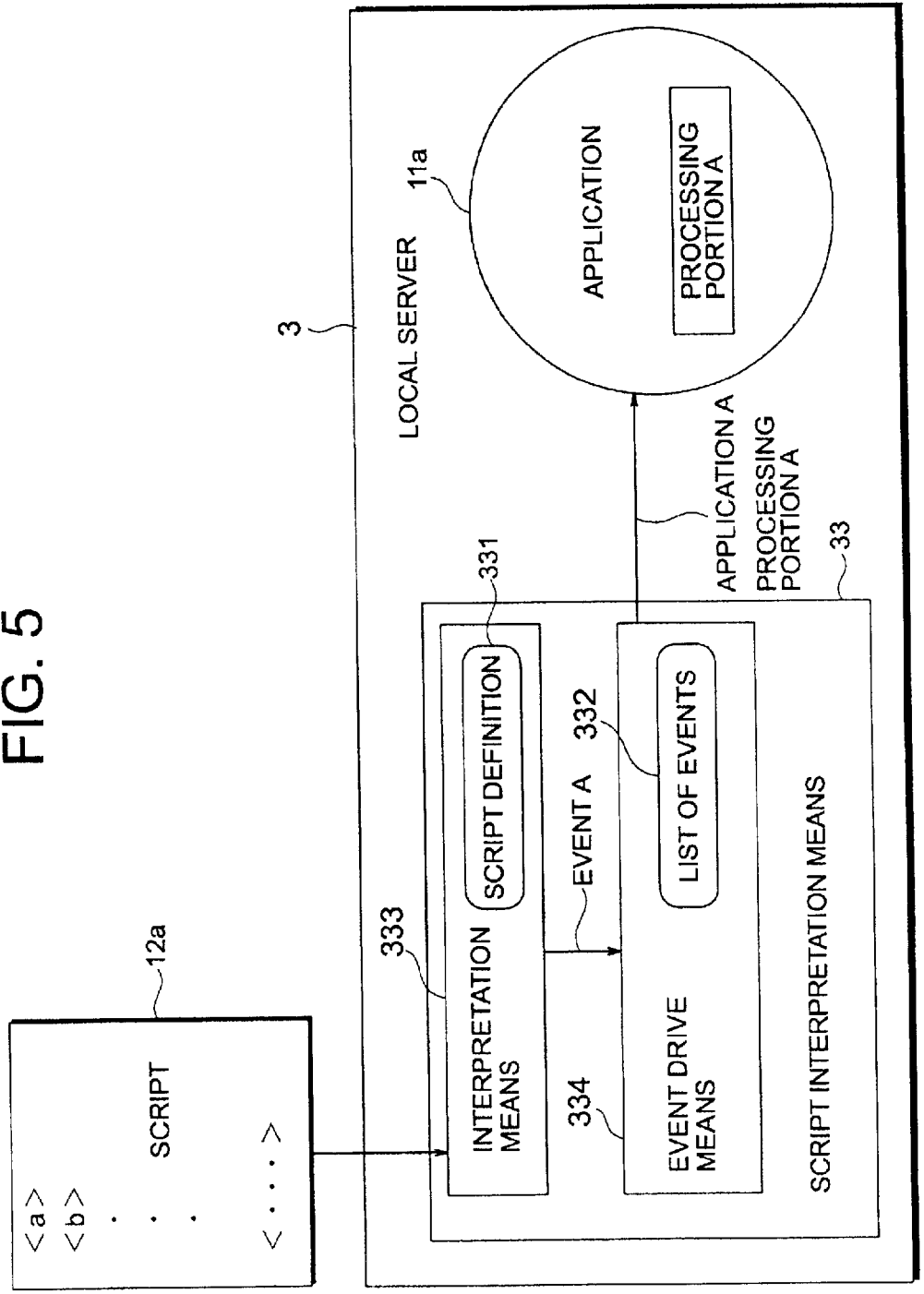
FIG. 5 is a block diagram illustrating the constitution of a major portion according to an embodiment 3 of the present invention.
Figure 6:
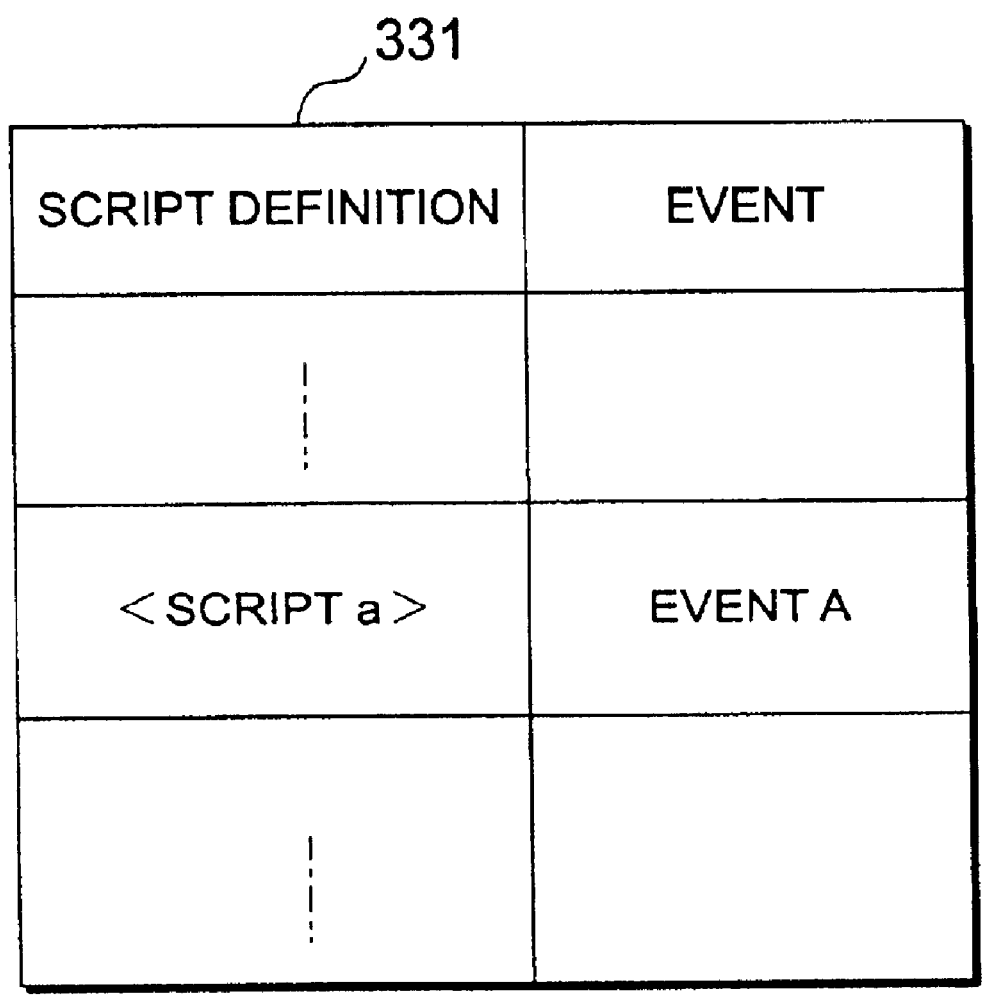
FIG. 6 is a diagram illustrating a script definition according to the embodiment 3 of the present invention.
Figure 7:
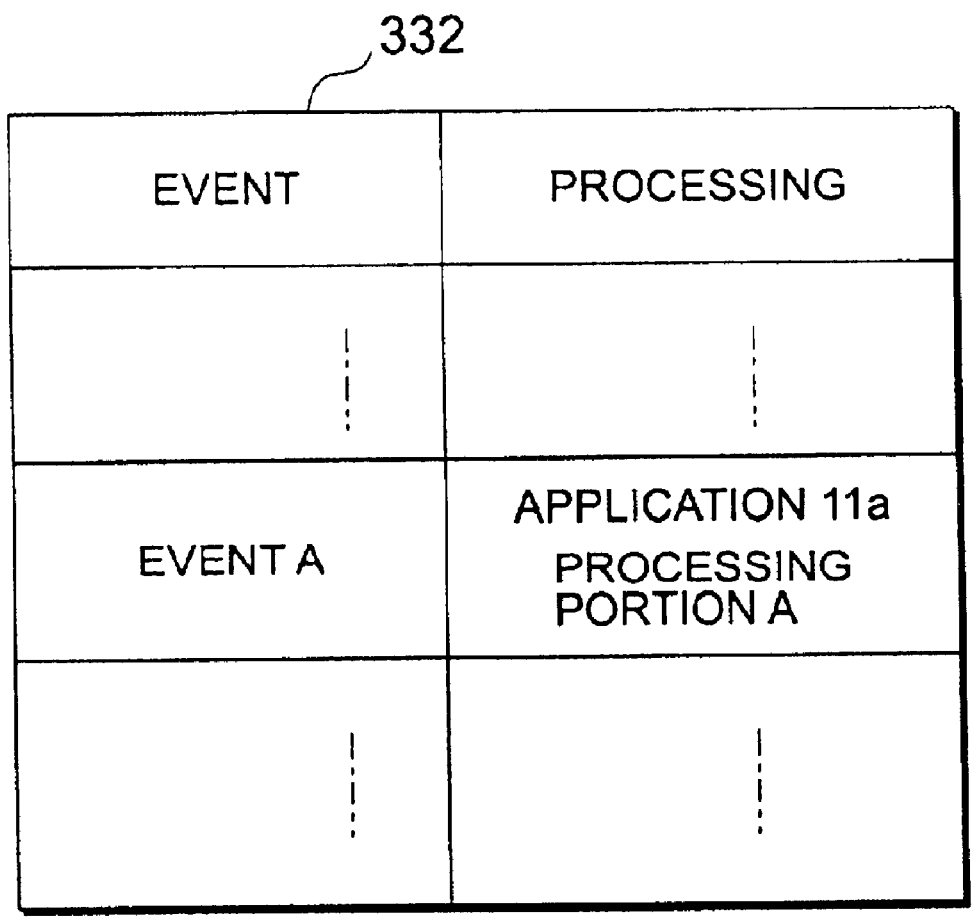
FIG. 7 is a diagram illustrating a list of events according to the embodiment 3 of the present invention.

Described below with reference to FIGS. 5 to 7 is an embodiment 3 of the present invention embodying the script interpretation means 33.

FIG. 5 is a block diagram of a constitution for concretely illustrating the function of the script interpretation means 33 in the local server 3, and illustrates only the peripheral constitution of the script interpretation means 33.

The constitution that is not shown in FIG. 5 is the same as the one described above (see FIGS. 1 and 3). In FIG. 5, the script interpretation means 33 includes a script definition 331, a list 332 of events, an interpretation means 333 and an event drive means 334.

The interpretation means 333 includes a script definition 331, interprets the script 12 according to the script definition 331, and outputs an event corresponding to the content of the definition of the script 12.

The event drive means 334 includes a list 332 of events, fetches the events, and picks up the processing driven by the event according to the list 332 of events.

FIG. 6 is a diagram illustrating an example of the script definition 331 according to the embodiment 3 of the present invention, and FIG. 7 is a diagram illustrating a list 332 of events according to the embodiment 3 of the present invention.

In FIG. 6, the script definition 331 stores, in the form of a map, the events corresponding to the contents of definitions in the script 12a and shows, for example, an event A which corresponds to the content of definition <script a>.

In FIG. 7, the list 332 of events is storing, in the form of a map, the applications and the processing portions corresponding to the events and shows, for example, an application 11a and a processing portion A corresponding to an event A.

Figure 8:
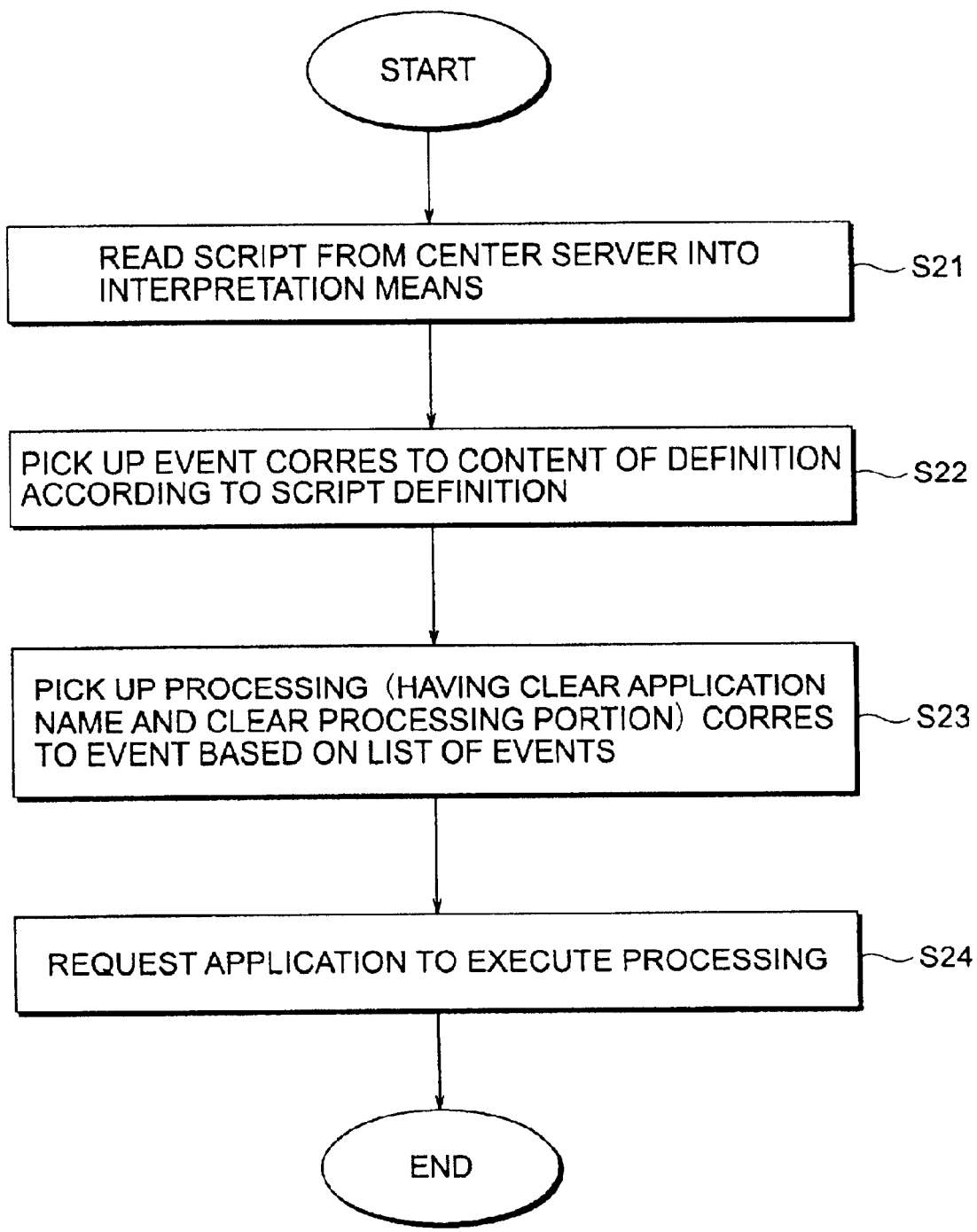
FIG. 8 is a flowchart illustrating the operation according to the embodiment 3 of the present invention.

Next, the operation of the embodiment 3 of the invention shown in FIGS. 5 to 7 will be described with reference to a flowchart of FIG. 8.

The following description gives attention to only the processing of the script interpretation means 33.

First, due to the interposition of the remote management means 32 (see FIGS. 1 and 3), the local server 3 reads the script 12a in the center server 1 into the interpretation means 333 in the script interpretation means 33 (step S21).

Next, the interpretation means 333 picks up the event A corresponding to the content of definition <script a>according to the script definition 331 (step S22).

Then, the event drive means 334 picks up the processing (application 11a, processing A) corresponding to the event A according to the list 332 of events (step S23) and requests the application 11a to execute the processing (step S24).

As a result, the script interpretation means 33 flexibly defines the specifications of the script 12 for safely and reliably executing the processing.

That is, owing to the script definition 331, the script 12 can be defined in a form independent from the processing.

The script 12 itself can be so specified as to define the pure meaning of the processing without limited by the specifications of the network constituting the system, hardware and software.

The script definition 331 crosslinks the script 12 that is meaningfully specified with the real system, and defines the correspondence between the description in the script 12 and the event based on the specifications of the system.

On the other hand, the list 332 of events crosslinks the event based on the specifications of the system with the mounting of the software that really operates, expands the degree of freedom in designing the software relying on the above-mentioned constitution, and makes it possible to freely fabricate the constitution of the software corresponding to a given event.

For a local server 3 having a small memory capacity, for example, software that uses less memory is mounted. For a local server 3 for which processing speed is demanded rather than worrying about any limitation on memory capacity, on the other hand, software which gives importance to performance is mounted.

The mounting can be easily sorted by simply changing the list of events 332 in the local server 3.

Embodiment 4.

The above embodiment 3 did not closely describe the form of description of the script 12 and of the script definition 331. They, however, may be described in a manner as shown in FIGS. 9 and 10.

Described below with reference to FIGS. 9 and 10 is an embodiment 4 of the present invention embodying the form of describing the script 12 and the script definition 331.

FIGS. 9 and 10 are diagrams illustrating the description of services of the script 12 and the script definition 331.

In FIG. 9, the script 12 handled in the script interpretation means 33 (see FIG. 5) is described in XML (extensible markup language).

In FIG. 10, the script definition 331 in the interpretation means 333 is described in DTD (document type definition) to correspond to the XML document.

When the script 12 describing the operation of the application 11 is given by the XML as shown in FIG. 9, a general-purpose XML parser is used in the script interpretation means 33.

In this case, use of SAX (simple API for XML) which is a standard specification of the parser makes it possible to pick up events such as start and end of a tag.

In the case of the air conditioner control service described as shown in FIGS. 9 and 10, events are successively picked up, such as start of air conditioner control, start of initialization, start of air conditioner initialization, setting of temperature, setting of the wind velocity, end of air conditioner initialization, start of temperature sensor initialization - - - .

Further, the event drive means 334 in the script interpretation means 33 executes the corresponding processing based upon the list of events 332.

Upon defining the tag of XML for every event that occurs, as described above, it is allowed to pick up the event from the script 12 (XML document) by using a standard XML parser.

By describing the script definition 331 in the interpretation means 333 in the DTD form (see FIG. 10) corresponding to XML, further, correctness of the XML document (script 12) can be verified based on the function of the XML parser.

That is, upon verifying the DTD, it is allowed to guarantee that the script 12 has been correctly described.

Embodiment 5.

The above embodiment 1 has closely described neither the fault countermeasure means 13 in the center server 1 nor the highly reliable means 34 in the local server 3. However, the fault countermeasure means 13 and the highly reliable means 34 may be constituted as shown in FIG. 11.

Figure 11:
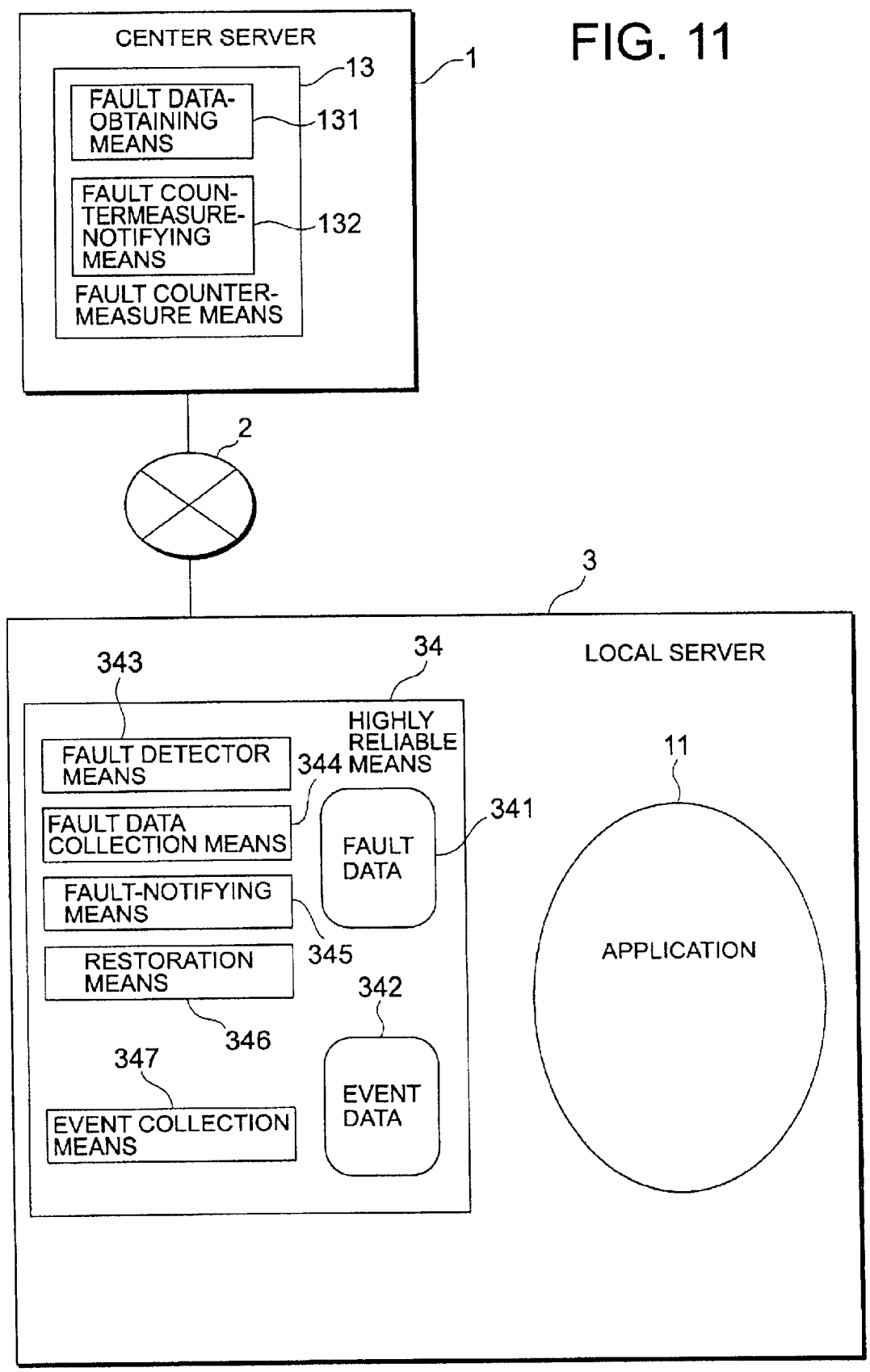
FIG. 11 is a block diagram illustrating the constitution of an embodiment 5 of the present invention.

Described below with reference to FIG. 11 is an embodiment 5 of the present invention embodying the fault countermeasure means 13 and the highly reliable means 34.

FIG. 11 is a block diagram of a constitution for concretely illustrating the functions of the fault countermeasure means 13 and the highly reliable means 34, and wherein the constitution that is not shown is the same as the one described above (see FIG. 1).

In FIG. 11, the fault countermeasure means 13 includes a fault data-obtaining means 131 for obtaining data related to a fault that has occurred from the local server 3, and a fault countermeasure-notifying means 132 for determining the countermeasure against the fault that has occurred and for notifying the fault countermeasure to the local server 3.

The highly reliable means 34 includes fault data 341, event data 342, a fault detector means 343, a fault data collection means 344, a fault-notifying means 345, a restoration means 346 and an event collection means 347.

The fault detector means 343 detects the occurrence of fault, the fault data collection means 344 collects the fault data 341 of when fault has occurred, and the fault-notifying means 345 informs the center server 1 of the fault data 341.

The restoration means 346 restores the fault in response to the fault countermeasure from the center server 1.

The event collection means 347 collects and records the event data 342.

Next, the operation of the embodiment 5 of the invention will be described with reference to a flowchart of FIG. 12.

The following description gives attention to the cooperation processing of the fault countermeasure means 13 in the center server 1 and the highly reliable means 34 in the local server 3.

Figure 12:
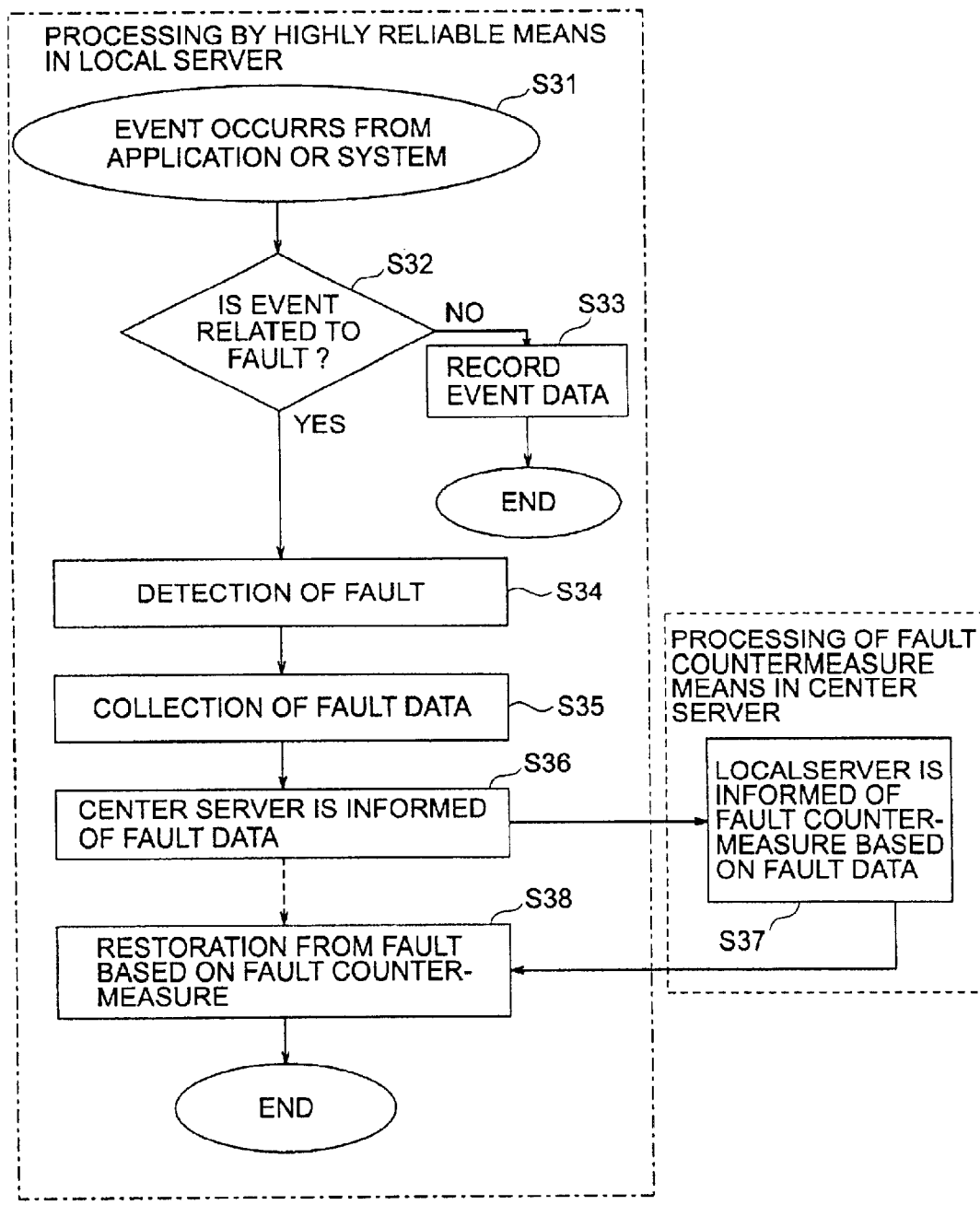
FIG. 12 is a flowchart illustrating the operation according to the embodiment 5 of the present invention.

In FIG. 12, first, when an event occurs from the application 11 or the system (OS in the local server 3, etc.) (step S31), the event collection means 347 in the highly reliable means 34 collects the event that has occurred and judges whether the event is the one related to the fault (step S32).

When it is judged at step S32 that the event that is collected is a normal event which is not related to the fault (not the event under the abnormal condition)(i.e., NO), the event is recorded as event data 342 (step S33), and the processing routine of FIG. 12 ends.

On the other hand, when it is judged at step S32 that the event that is collected is related to the fault (event under the abnormal condition)(i.e., YES), the fault detector means 343 is informed of the occurrence of the fault (step S34).

The fault detector means 343 examines the event of under abnormal condition, specifies the kind of the fault (fault data), starts the fault data collection means 344 and stores the event as fault data 341 (step S35).

The thus detected fault data 341 is then sent to the center server 1 via the fault-notifying means 345 (step S36).

In response thereto, the fault countermeasure means 13 in the center server 1 executes the following processing.

That is, the fault data-obtaining means 131 receives fault data 341 from the local server 3, and the fault countermeasure-notifying means determines a suitable countermeasure against the fault data 341 and sends it to the local server 3 (step S37).

In response thereto, the highly reliable means 34 in the local server 3 executes the processing by the restoration means 346. That is, the operation for restoration from the fault is executed based on the countermeasure sent from the center server 1 (step S38), and the processing routine of FIG. 12 ends.

Thus, owing to the cooperation processing between the fault countermeasure means 13 in the center server 1 and the highly reliable means 34 in the local server 3, it is allowed to prevent the whole system from malfunctioning despite an abnormal condition has occurred.

Further, the fault data 341 and the event data 342 stored as logs in the local server 3 can be utilized for the subsequent system analysis and the like. Even in case the system as a whole comes into a halt, the analysis can be smoothly conducted.

The fault data 341 is sent to the center server 1 and may, hence, be stored in the center server 1 instead of in the local server 3.

Embodiment 6.

The above embodiment 5 did not closely describe the fault countermeasure-notifying means 132 in the fault countermeasure means 13. However, the fault countermeasure-notifying means 132 may be constituted as shown in FIG. 13.

Figure 13:
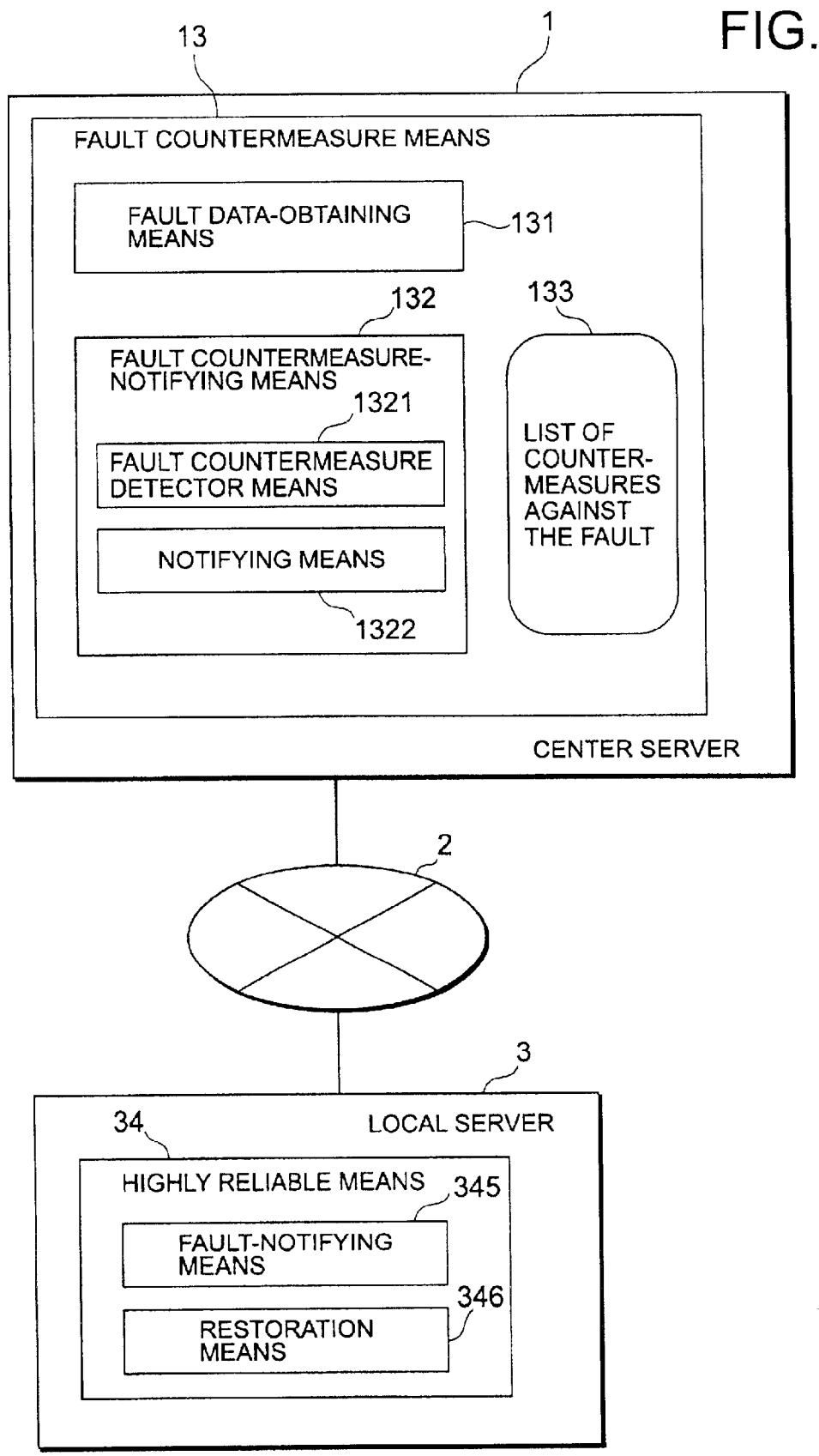
FIG. 13 is a block diagram illustrating the constitution of an embodiment 6 of the present invention.

Described below with reference to FIG. 13 is an embodiment 6 of the present invention embodying the fault countermeasure-notifying means 132 in the fault countermeasure means 13.

FIG. 13 is a block diagram of a constitution for concretely illustrating the function of the fault countermeasure-notifying means 132, and wherein the constitution that is not shown is the same as the constitution described above (see FIGS. 1 and 11).

In FIG. 13, the fault countermeasure means 13 in the center server 1 is provided with a list 133 of countermeasures against the fault in addition to the above-mentioned fault data-obtaining means 131 and the fault countermeasure-notifying means 132.

The list 133 of countermeasures against fault stores, in the form of a map, the countermeasures against fault for each of the kinds of fault data in a manner that the kinds of the fault data are corresponded to the countermeasures against fault.

The fault countermeasure-notifying means 132 includes the fault countermeasure detector means 1321 and the notifying means 1322.

The fault countermeasure detector means 1321 detects the countermeasure system corresponding to the kind of the fault data based upon the list 133 of countermeasures against fault.

The notifying means 1322 informs the local server 3 of the countermeasure against fault obtained from the list 133 of countermeasures against fault.

Next, the operation of the embodiment 6 of the invention will be described with reference to a flowchart of FIG. 14.

The following description gives attention to the fault countermeasure processing in the center server 1.

Figure 14:
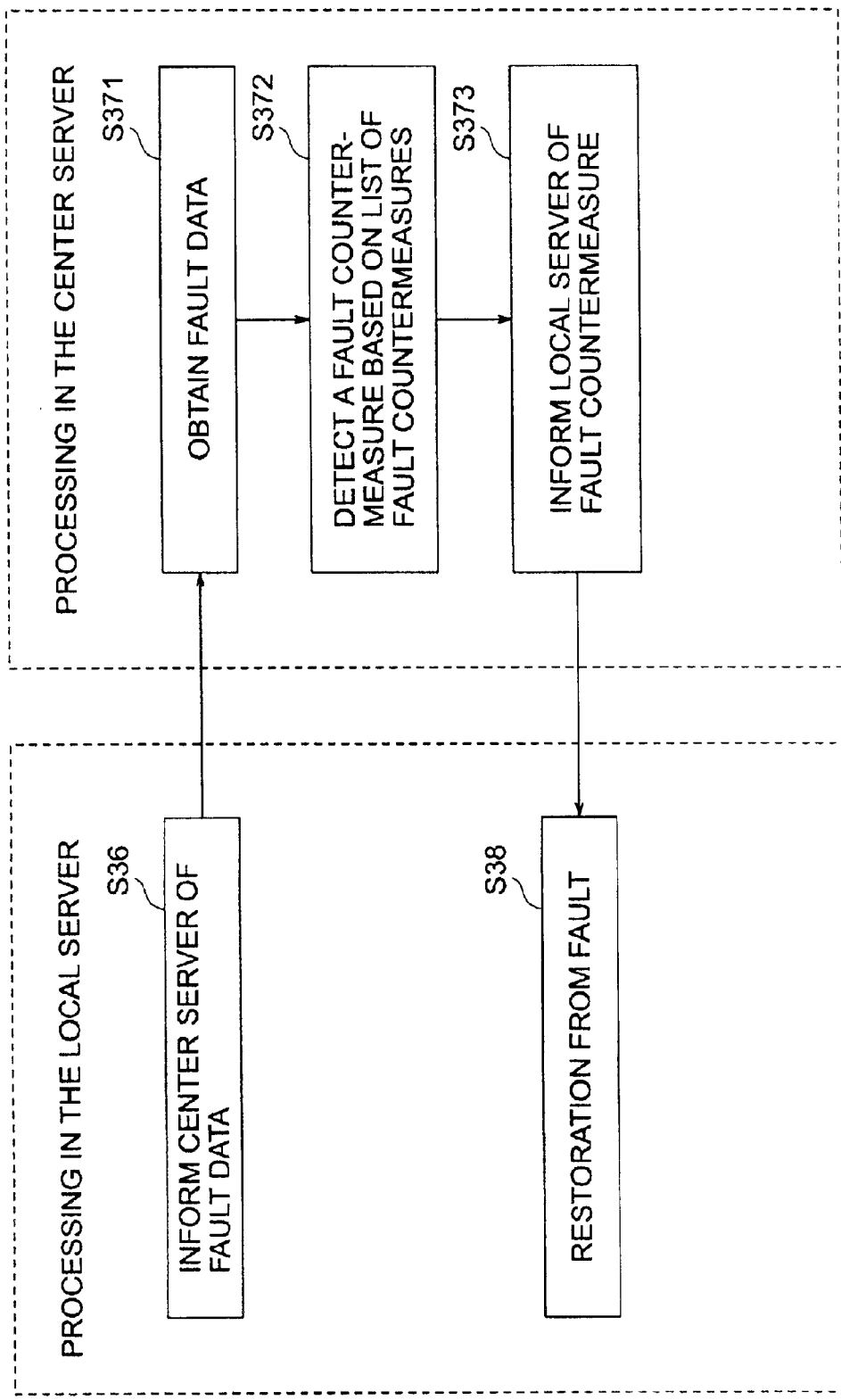
FIG. 14 is a flowchart illustrating the operation according to the embodiment 6 of the present invention.

In FIG. 14, the processings at steps S36 and S38 are the same as those described above (see FIG. 12), and the processings at steps S31 to S35 that are not shown in FIG. 14 are the same as those of FIG. 12.

When a fault occurs in the local server 3, fault data (kind) is sent to the center server 1 through the fault-notifying means 345 as described above (step S36).

The fault data-obtaining means 131 in the center server 1 receives fault data from the local server 3 (step S371) and hands it over to the fault countermeasure detector means 1321 in the fault countermeasure-notifying means 132.

The fault countermeasure detector means 1321 detects the countermeasure corresponding to the kind of the fault data that is sent based upon the list 133 of countermeasures against fault (step S372).

Then, the countermeasure-notifying means 1322 transmits the detected countermeasure against fault to the restoration means 346 in the local server 3 (step S373).

Then, the restoration means 346 executes the processing corresponding to the countermeasure against fault (step S38).

Thus, the fault countermeasure means 13 in the center server 1 is provided with the fault countermeasure detector means 1321 that works based on the list 133 of countermeasures against fault, facilitating the designing to cope with fault in advance and guaranteeing safety of the whole system.

The list 133 of the countermeasures against fault can be updated in real time and can readily be reflected in the system when the kinds of fault data are newly increased or when it is demanded to employ more efficient countermeasures against fault.

Embodiment 7.

In the above-mentioned embodiments 5 and 6, the fault countermeasure means 13 in the center server 1 was provided with the fault countermeasure-notifying means 132, and the local server 3 was informed of the countermeasure corresponding to the kind of fault data. However, the highly reliable means 34 in the local server 3 may autonomously execute the countermeasures against fault.

Figure 15:
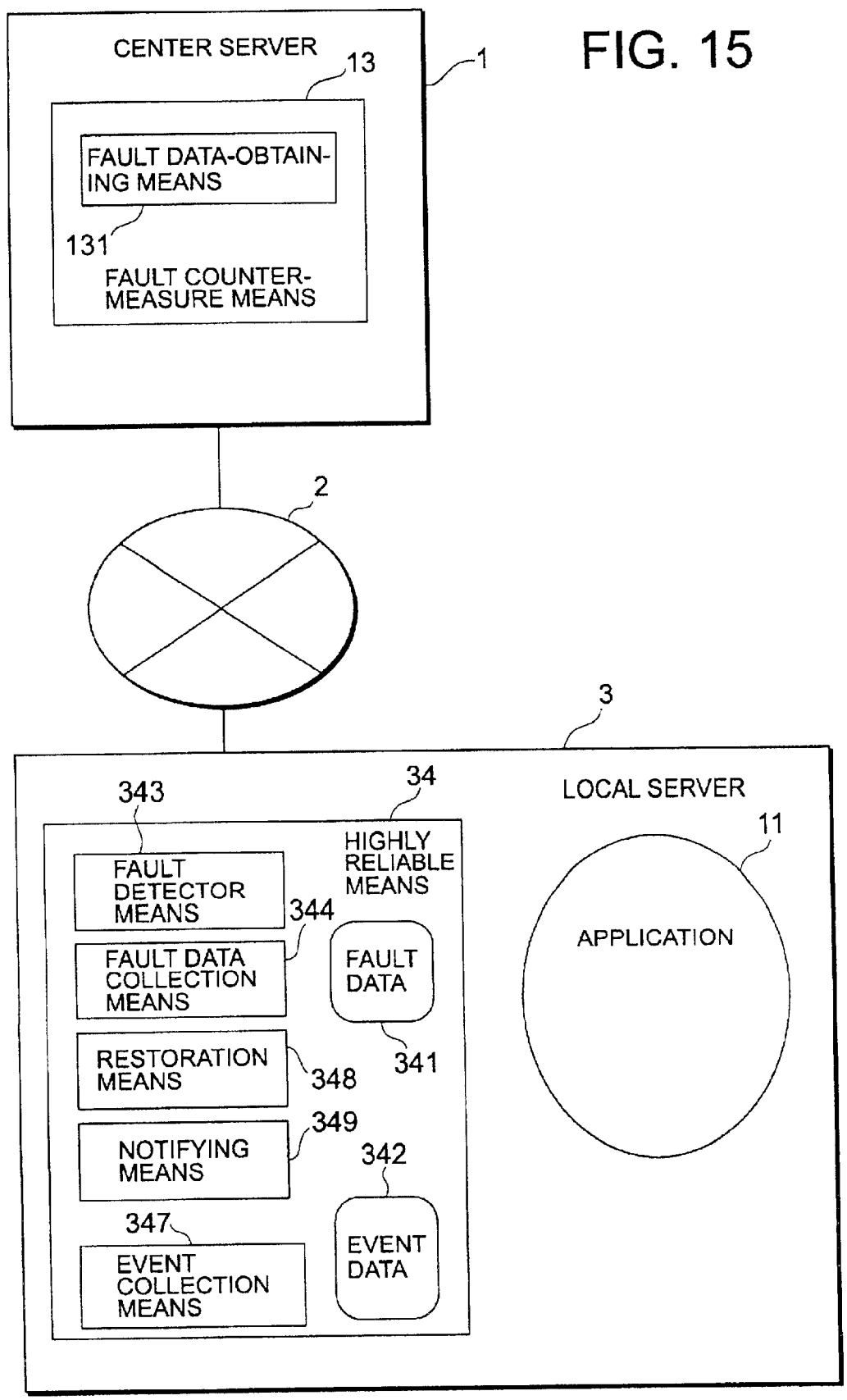
FIG. 15 is a block diagram illustrating the constitution of an embodiment 7 of the present invention.

Described below with reference to FIG. 15 is an embodiment 7 of the present invention which autonomously executes the countermeasure against fault in the highly reliable means 34.

FIG. 15 is a block diagram of a constitution for concretely illustrating the function of the highly reliable means 34, wherein the same portions as those described above (see FIGS. 1, 11 and 13) are denoted by the same reference numerals but are not described here again.

In FIG. 15, the fault countermeasure means 13 in the center server 1 has the fault data-obtaining means 131 but does not have the above-mentioned fault countermeasure-notifying means 132 (see FIGS. 11 and 13).

The highly reliable means 34 in the local server 3 includes the above-mentioned fault data 341, event data 342, fault detector means 343, fault data collection means 344, event collection means 347, as well as restoration means 348 and notifying means 349.

The restoration means 348 autonomously copes with the fault that has occurred to restore from the fault.

The notifying means 349 informs the fault data-obtaining means 131 in the center server 1 of the fault data 341 and of the data related to automatic restoration.

Next, the operation of the highly reliable means 34 according to the embodiment 7 of the present invention will be described with reference to a flowchart of FIG. 16.

In FIG. 12, steps S31 to S35 are the same processings as those described above (see FIG. 12).

In this case, the processings are the same as those described above from the occurrence of event (step S31) through up to the collection of fault data (step S35).

Hereinafter, the highly reliable means 34 in the local server 3 does not inform the center server 1 of the fault data but completes the automatic restoration processing for the fault in the local server 3 (step S39).

Figure 16:
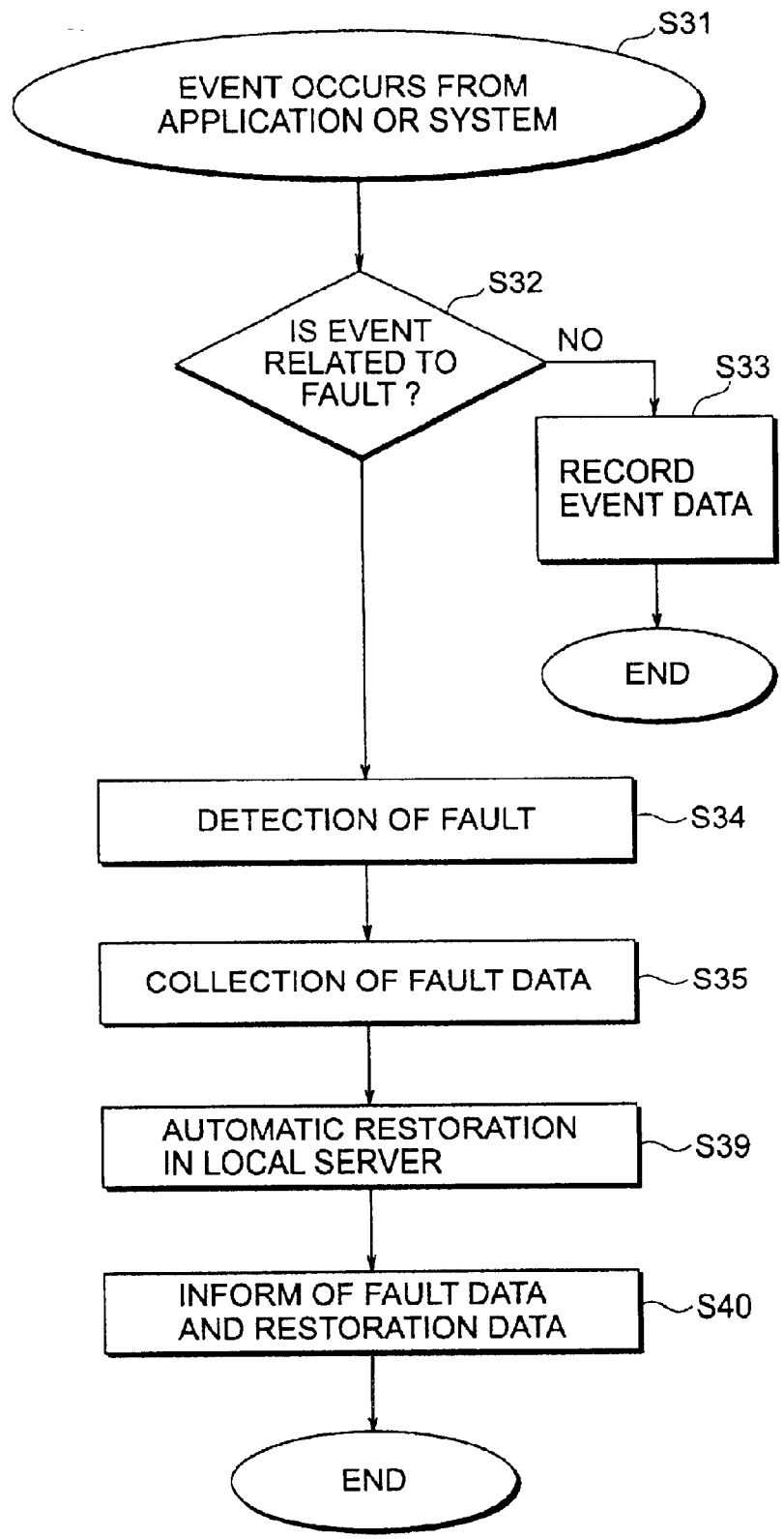
FIG. 16 is a flowchart illustrating the operation according to the embodiment 7 of the present invention.

Finally, the fault data-obtaining means 131 in the center server 1 is informed of only the fault data 341 and the result of automatic restoration (step S40), and the processing routine of FIG. 16 ends.

This simplifies the functional constitution of the fault countermeasure means 13 in the center server 1, and the notifying processing (step S40) needs be effected only once for informing the center server 1 of the fault data 341 and the fault countermeasure from the local server 3, reducing the amount of communication that flows into the wide-area network 2.

At the occurrence of fault, further, the restoration is readily completed in the local server 3 making it possible to shorten the time for coping with the fault.

This system for coping with the fault is effective for executing simple processing, such as when the degree of fault is very small, when the faulty application 11 needs simply be re-started, etc.

In the case of the fault that requires complex processing, therefore, the system for coping with the fault of the embodiment 5 or 6 can often be effectively utilized.

Embodiment 8.

Though none of the embodiments 1 to 7 have referred to the number of the local servers 3 connected to the center server 1, plural local servers 3 may be connected to the center server 1.

An embodiment 8 of the present invention in which plural local servers 3 are connected to the center server 1 will now be described with reference to FIG. 17.

Figure 17:
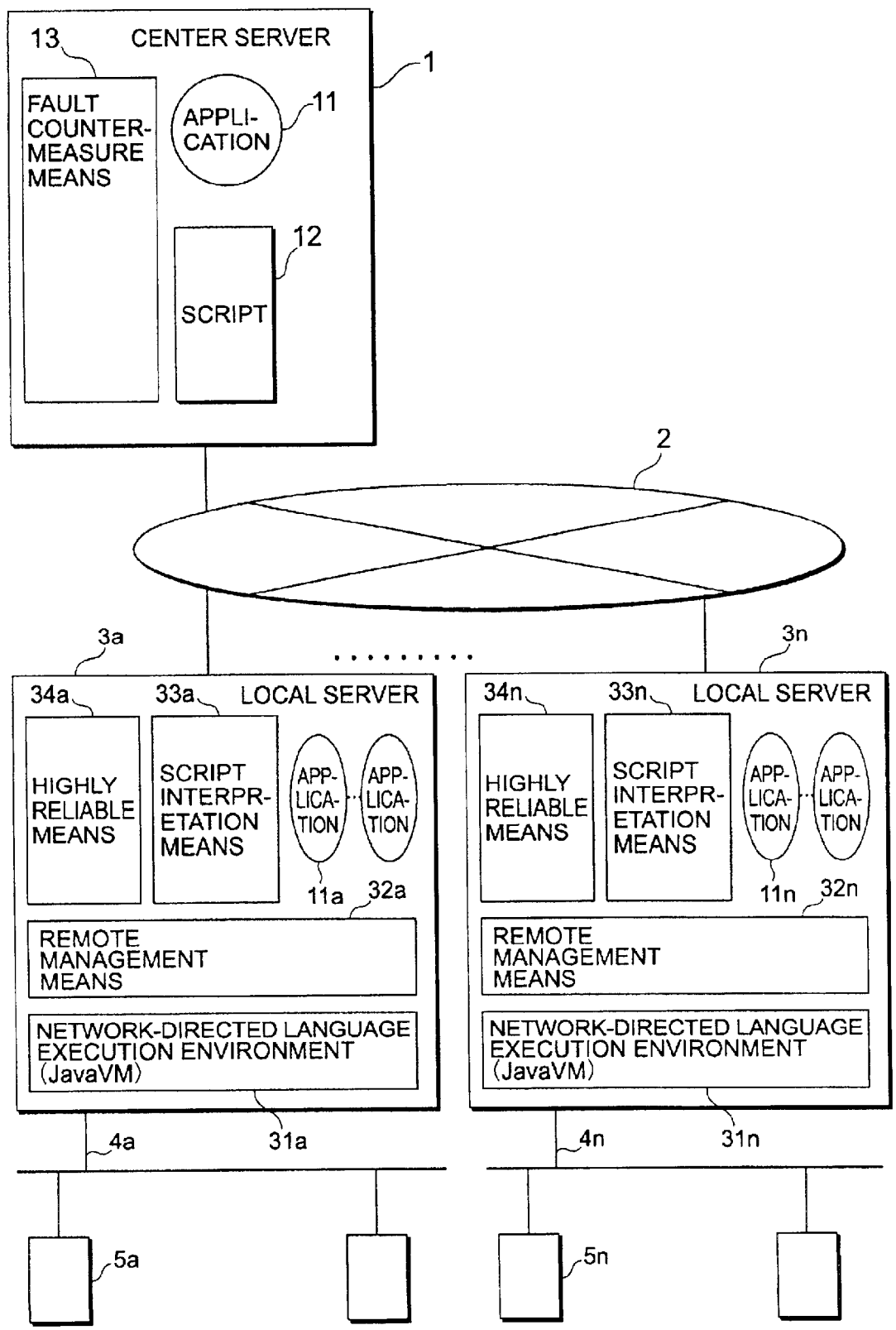
FIG. 17 is a block diagram illustrating the constitution of an embodiment 8 of the present invention.

FIG. 17 is a block diagram of the constitution illustrating the embodiment 8 of the present invention, wherein the same portions as those described above (see FIG. 1) are denoted by the same reference numerals but are not described again.

In FIG. 17, local servers 3*a* to 3*n* of a number of, for example, n are connected to the center server 1.

Equipment 5*a* to 5*n* that are to be managed are connected to the local servers 3*a* to 3*n* of the same constitution via local networks 4*a* to 4*n*, respectively.

Even in a system where there exist plural local servers 3*a* to 3*n* as shown in FIG. 17, the center server 1, in theory, needs be employed in a number of only one. In this case, too, the basic operation is the same as the one described above, exhibiting the action and effect same as those described above.

In a large-scale network-directed software distribution system, too, therefore, the reliability can be improved in the same manner as described above.

Depending upon the scale of the system, the number of the center servers 1 may be increased to meet the scale of the system in order to decrease the burden exerted on each center server 1.

When plural center servers 1 are provided, redundancy can be imparted to the center server function. Even in case any center server breaks down, therefore, other center servers work to back up, maintaining improved reliability.

Embodiment 9.

In the above-mentioned embodiment 1, the center server 1 is provided with the fault countermeasure means 13 and the local server 3 is provided with the highly reliable means 34. Here, however, the fault countermeasure means 13 and the highly reliable means 34 may be omitted.

Figure 18:
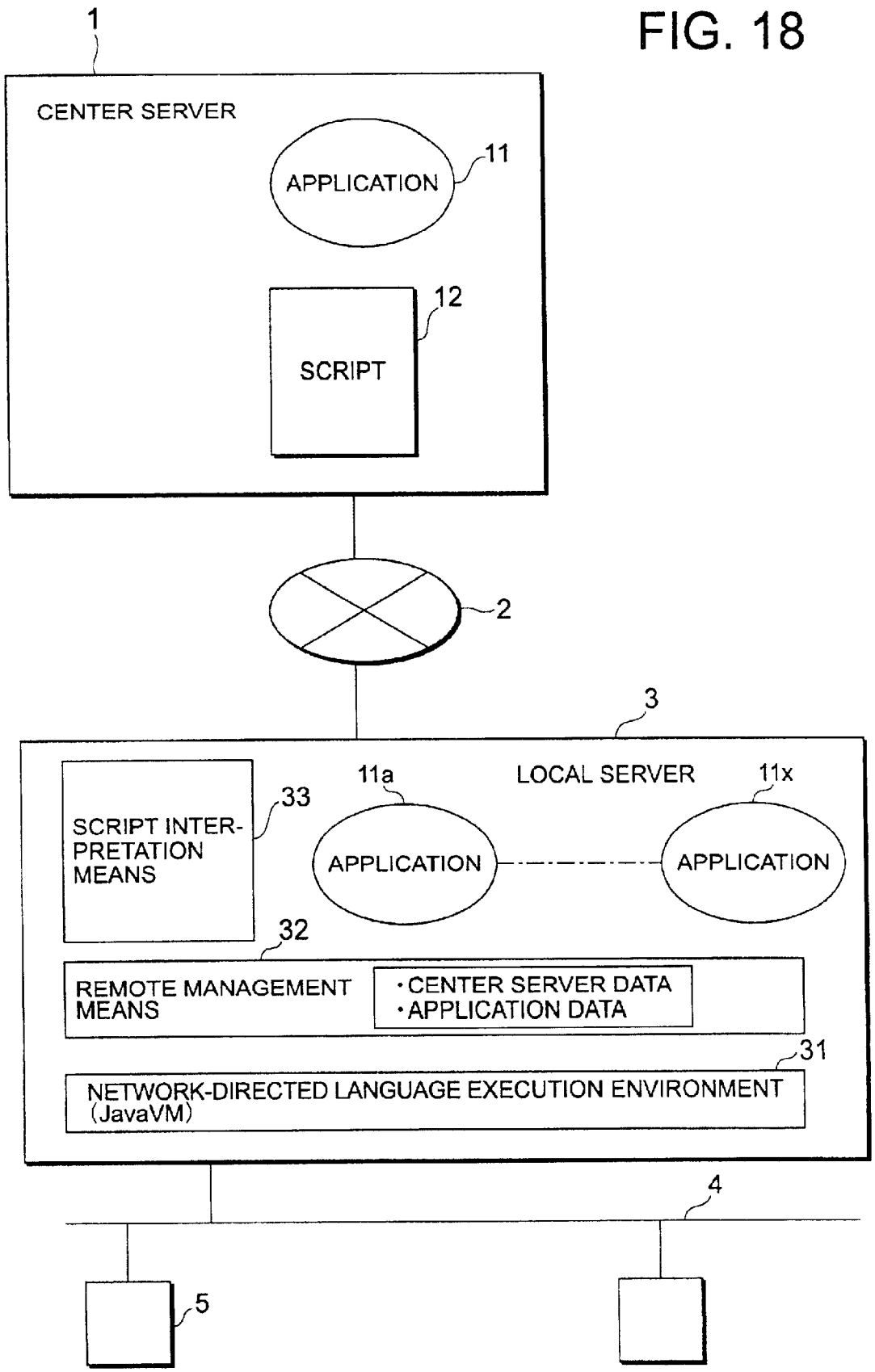
FIG. 18 is a block diagram illustrating the constitution of an embodiment 9 of the present invention.

Described below with reference to FIG. 18 is an embodiment 9 of the present invention omitting the fault countermeasure means 13 and the highly reliable means 34.

FIG. 18 is a block diagram of a constitution illustrating the embodiment 9 of the present invention, wherein the same portions as those described above (see FIG. 1) are denoted by the same reference numerals but are not described here again.

Therefore, the operation of the embodiment 9 of the invention shown in FIG. 18 is the same as that of the above-mentioned flowchart (see FIG. 2) from which are deleted steps S5 to S8 that are related to the fault countermeasure means 13 and the highly reliable means 34.

In this case, the software operating in the local server 3 can be very simplified.

The constitution of FIG. 18 is effective when the reliability can be maintained to a sufficient degree relying only upon the control operation by the script 12.

Thus, the software constitution of the local server 3 is simplified, and a highly reliable processing is realized even by using the local server 3 having a small memory capacity.

Embodiment 10.

Though the above-mentioned embodiment 9 did not refer to the number of the local servers 3 connected to the center server 1, plural local servers 3 may be connected to the center server 1 like in the above-mentioned embodiment 8.

An embodiment 10 of the invention in which plural local servers 3 are connected to the center server 1 will now be described with reference to FIG. 19.

Figure 19:
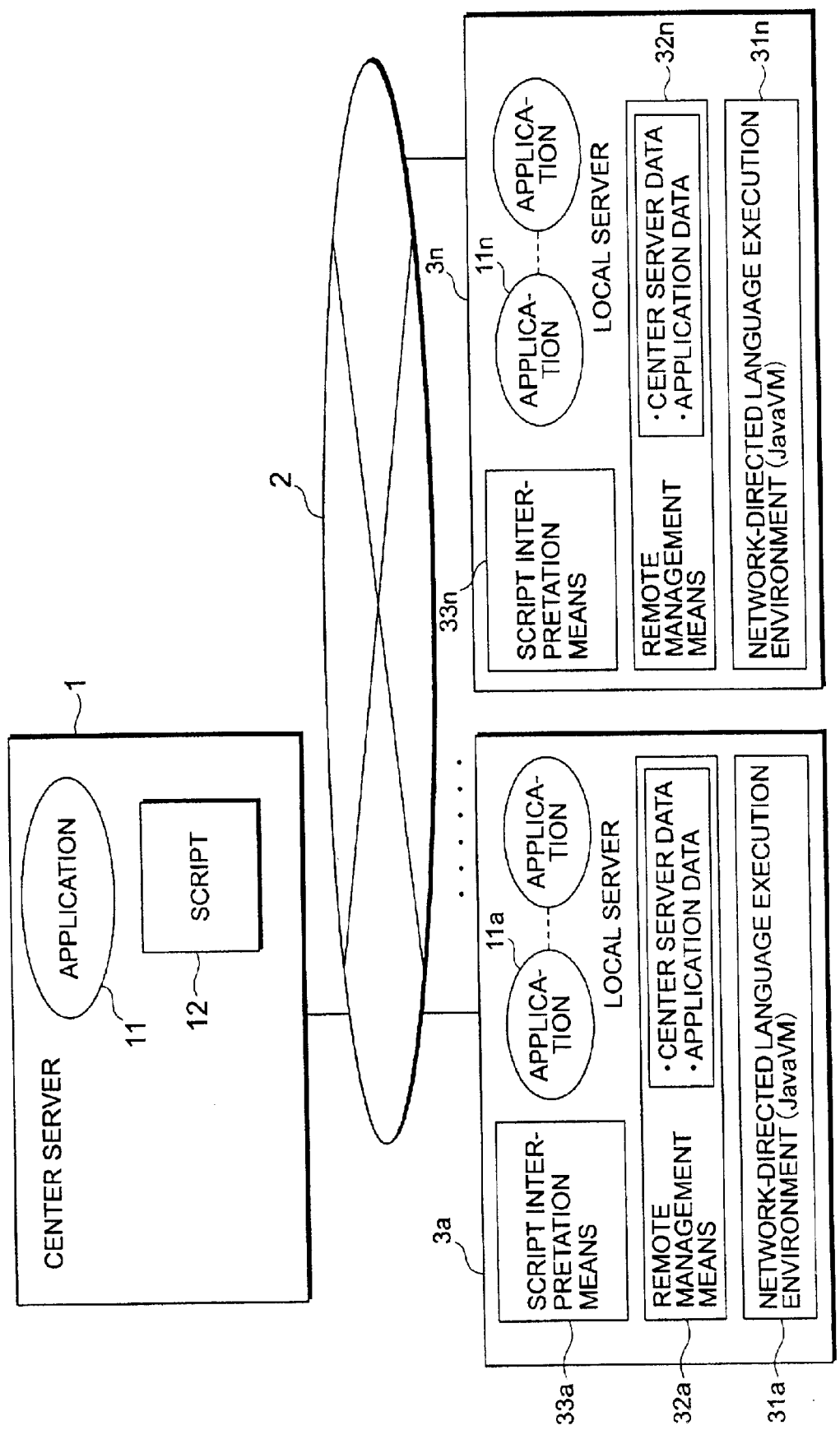
FIG. 19 is a block diagram illustrating the constitution of an embodiment 10 of the present invention.

In FIG. 19, plural local servers 3*a* to 3*n* are connected to the center server 1.

Even in a system having plural local servers 3*a* to 3*n* as shown in FIG. 19, the center server 1, in theory, needs be employed in a number of only one, and the basic operation is the same as described above.

This makes it possible to improve the reliability even in a large-scale network-directed software distribution system in which there exist plural local servers 3 that execute simple processings.

Embodiment 11.

In the above-mentioned embodiment 8 (see FIG. 17), the local servers 3*a* to 3*n* connected to the center server 1 are all provided with highly reliable means 34*a* to 34*n*. However, only some of the local servers 3 may be provided with the highly reliable means 34, and the highly reliable means 34 may be omitted from other local servers 3.

Figure 20:
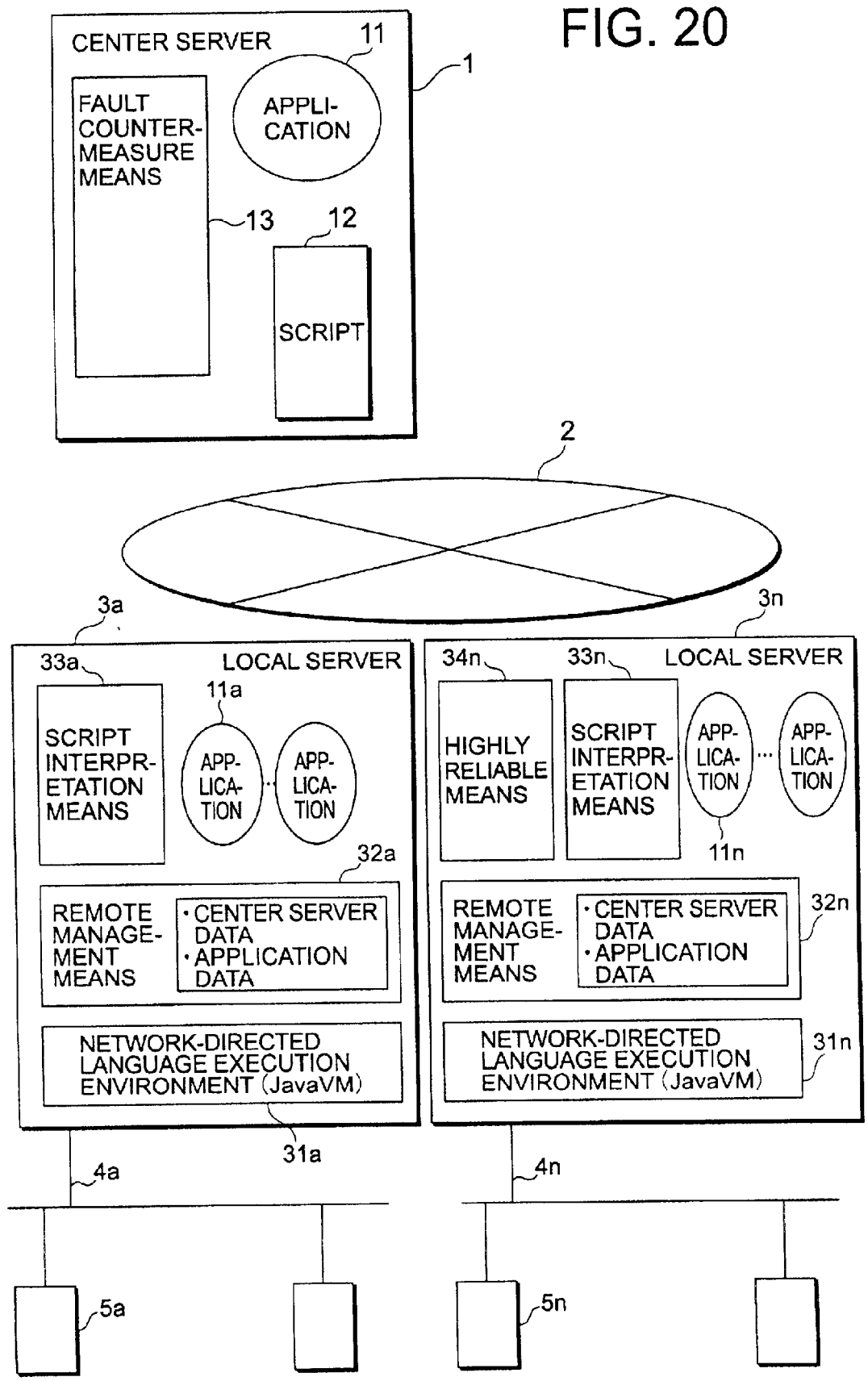
FIG. 20 is a block diagram illustrating the constitution of an embodiment 11 of the present invention.

Described below with reference to FIG. 20 is an embodiment 11 of the present invention in which only some of the plural local servers 3 are provided with the highly reliable means 34.

FIG. 20 is a block diagram of a constitution illustrating the embodiment 11 of the present invention, wherein the same portions as those described above (see FIG. 17) are denoted by the same reference numerals but are not described here again.

Among plural local servers 3*a* to 3*n* in FIG. 20, some local servers 3*a* are not equipped with the highly reliable means 34 but other local servers 3*n* are equipped with the highly reliable means 34*n*.

The basic operation of the embodiment 11 of the invention shown in FIG. 20 is the same as the one described above in connection with the local servers 3*a* to 3*n*.

The constitution of FIG. 20 is effective in a system which contains local servers 3*n* that require the highly reliable means 34*n* and local servers 3*a* that do not require the highly reliable means 34.

In this case, too, the center server 1 equipped with the fault countermeasure means 13 may, in theory, be provided in a number of only one, and the basic operation is the same as the one described above. Further, the number of the center servers 1 may be increased with an increase in the scale of the system.

Thus, it is allowed to improve reliability of even a large-scale network-directed software distribution system which contains local servers 3*a* for executing simple processings and local servers 3*n* for execute normal highly reliable processings.

Embodiment 12.

In the above-mentioned embodiment 1, the center server 1 was provided with the script 12, and the local server 3 was provided with the script interpretation means 33. However, the script 12 and the script interpretation means 33 may be omitted.

This can be effectively employed for a simple system that operates with the application 11 only, and the constitutions of the center server 1 and the local servers 3 can be simplified.

In case a fault occurs, the countermeasure exhibits the same action and effect as those described above.

This can be further applied to a system in which plural local servers 3 are connected to the center server 1.

What is claimed is:

1. A software management system comprising a network system which includes a center server and a local server connected to said center server via a wide-area network, wherein:

said center server includes:
an application that operates upon being downloaded onto said local server;
a script describing operation of application; and
fault countermeasure means for coping with occurrence of a fault; and said local server includes:
a network-directed language execution environment;
remote management means for downloading the application from said center server, and for deleting the application after processing has finished;
script interpretation means for interpreting the script and for requesting the application to execute; and
highly reliable means for recording event data that occur while the application is being executed, for managing data when a fault has occurred, and for executing restoration processing.

2. The software management system according to claim 1, wherein said fault countermeasure means includes:
fault data-obtaining means for obtaining fault data from said local server when a fault has occurred; and
fault countermeasure-notifying means for determining the countermeasure against the fault when the fault has occurred and for notifying said local server; and
said highly reliable means includes:
fault detector means for detecting occurrence of a fault;
fault data correction means for correcting the fault data when the fault has occurred;
fault-notifying means for sending the fault data to said center server;
restoration means for restoring, after the fault, relying upon the countermeasure against the fault from said center server; and
event collection means for collecting and recording the event data.

3. The software management system according to claim 2, wherein said fault countermeasure means includes:
a list of fault countermeasures, storing countermeasures against faults for each kind of the fault data; and
said fault countermeasure-notifying means includes:
fault countermeasure detector means for detecting a countermeasure against a fault corresponding to the kind of the fault data based upon a list of the fault countermeasures; and
notifying means for sending the countermeasure against fault to said local server.

4. The software management system according to claim 1, including a plurality of local servers,each local server including said network-directed language execution environment, said remote management means, said script interpretation means, and said highly reliable means.

5. The software management system according to claim 4, including a plurality of center servers, each center server including the application, the script, and said fault countermeasure means.

6. The software management system according to claim 1, wherein said remote management means includes:
center server data and application data;
request processing means that response to a request for executing the application;
application downloading means for downloading the application from said center server based upon the center server data and the application data; and
application management means for executing and deleting the application based on the application data.

7. The software management system according to claim 1, wherein said script interpretation means includes:
a script definition and a list of events;
interpretation means for interpreting the script in accordance with the script definition and for outputting an event corresponding to content of the script; and
event drive means for fetching the event and for picking up processing that is driven by the event according to the list of events.

8. The software management system according to claim 1, wherein the script is described in XML (extensible markup language), and the script definition is described in DTD (document type definition).

9. The software management system according to claim 1, wherein said fault countermeasure means includes:
fault data-obtaining means for obtaining fault data concerning when the fault has occurred, from said local server; and
said highly reliable means includes:
fault detector means for detecting occurrence of a fault;
fault data collection means for collecting fault data when the fault has occurred;
restoration means for autonomously coping with occurrence of a fault and automatically restoring after the fault;
notifying means for sending the fault data and automatic restoration data to said center server; and
event collection means for collecting and recording the event data.

10. The software management system according to claim 1, including a plurality of said local servers, at least one of said local servers including said network-directed language execution environment, said remote management means, said script interpretation means, and said highly reliable means, and other local servers including said network-directed language execution environment, said remote management means, and said script interpretation means.

11. The software management system according to claim 1, wherein the local server acquires the script and fault countermeasures from the center server.

12. A software management system comprising a network system which includes a center server and a local server connected to said center server via a wide-area network, wherein:

said center server includes:
an application that operates upon being downloaded onto said local server; and a script describing operation of the application; and said local server includes:

a network-directed language execution environment;

remote management means for downloading the application from said center server, and for deleting the application after processing has finished; and script interpretation means for interpreting the script and for requesting the application to execute.

13. The software management system according to claim 12, including a plurality of local servers, each local server including said network-directed language execution environment, said remote management means, and said script interpretation means.

14. A software management system comprising a network system which includes a center server and a local server connected to said center server via a wide-area network, wherein:

said center server includes:

an application that operates upon being downloaded on-to said local server; and fault countermeasure means for coping with occurrence of a fault; and said local server includes:

a network-directed language execution environment;

remote management means for downloading the application from said center server, and for deleting the application after processing has finished; and highly reliable means for recording event data that occur while the application is being executed, for managing data when a fault has occurred, and for executing restoration processing.

15. The software management system according to claim 14, including a plurality of local servers, each local server including said network-directed language execution environment, said remote management means, and said highly reliable means.

* * * * *